United States Patent
Sano

(10) Patent No.: US 6,377,964 B1
(45) Date of Patent: Apr. 23, 2002

(54) CAD SYSTEM FOR TEAM-BASED DESIGN FOR MANAGING UNDO AND REDO FUNCTIONS

(75) Inventor: Hiroaki Sano, Sakata-gun (JP)

(73) Assignee: Toyota Caelum Incorporated, Nagoya (JP)

( * ) Notice: Subject to any disclaimer, the term of this patent is extended or adjusted under 35 U.S.C. 154(b) by 0 days.

(21) Appl. No.: 09/260,132

(22) Filed: Mar. 1, 1999

(30) Foreign Application Priority Data

Apr. 3, 1998 (JP) .......................................... 10-091372

(51) Int. Cl.⁷ ................................................ G06F 7/21
(52) U.S. Cl. ...................................... 707/530; 707/502
(58) Field of Search ................................ 707/530, 531, 707/540, 502; 345/751, 753, 754, 755

(56) References Cited

U.S. PATENT DOCUMENTS

| | | | | |
|---|---|---|---|---|
| 5,173,854 A | * | 12/1992 | Kaufman et al. | 707/540 |
| 5,604,853 A | * | 2/1997 | Nagashima | 707/540 |
| 5,844,563 A | * | 12/1998 | Harada et al. | 345/420 |
| 5,890,181 A | * | 3/1999 | Selesky et al. | 707/530 |
| 6,111,575 A | * | 8/2000 | Martinez et al. | 345/810 |
| 6,192,378 B1 | * | 2/2001 | Abrams et al. | 707/204 |
| 6,292,804 B1 | * | 9/2001 | Ardoin et al. | 707/102 |

FOREIGN PATENT DOCUMENTS

JP    A-9-288690    11/1997

OTHER PUBLICATIONS

Prakash et al., "A framework for undoing actions in collaborative systems", ACM Transactions on Computer–Human Interaction, vol. 1, No. 4, Dec. 1994, pp. 295–330.*
G. D. Abowd et al., *Special Issue on CSCW: Part 1: Giving Undo Attention*, Interacting With Computers, vol. 4, No. 3, (1992), pp. 317–342.

* cited by examiner

*Primary Examiner*—Stephen S. Hong
(74) *Attorney, Agent, or Firm*—Oliff & Berridge, PLC

(57) ABSTRACT

A CAD system for team-based design provides an undo function and a redo function for execution by each designer during team-based design. A database server comprises a component DB and history DB provided for sharing in the same team, and a history DB manager for collecting history information of operator-performed operations and recording into the history DB. The history information includes the time an operation was performed, the element that is the object of the operation, the type of operation, the designer who performed the operation, and a validity flag of the history information. When a designer executes the undo function in the operator reference mode, the history information of the operations performed by the designer is searched, only the last operation performed by the designer is canceled, and the operations by the other designers in the same team are not canceled. Furthermore, when a designer executes the redo function, an operation that was canceled by the designer executing the last undo function is redone and the operations by the other designers in the same team are not redone.

8 Claims, 27 Drawing Sheets

BASIC DATA ORGANIZATIONAL EXAMPLE OF HISTORY DATABASE

| TIME OF DAY | OBJECT | OPERATION | DESIGNER | VALIDITY FLAG |
|---|---|---|---|---|
| T1 | ELEMENT 1 | CREATION | A | VALID |
| ⋮ | ⋮ | ⋮ | ⋮ | ⋮ |

TIME BASE REFERENCE HISTORY MANAGEMENT TABLE

MODEL REFERENCE HISTORY MANAGEMENT TABLE

OPERATOR REFERENCE HISTORY MANAGEMENT TABLE

BEFORE START OF DESIGN

TIME BASE REFERENCE HISTORY MANAGEMENT OBJECT —30

OPERATOR REFERENCE HISTORY MANAGEMENT OBJECT OPERATOR NAME:OPERATOR A —50

OPERATOR REFERENCE HISTORY MANAGEMENT OBJECT OPERATOR NAME:OPERATOR B —50

Fig. 7

(3) EXECUTION OF UNDO FUNCTION BY DESIGNER B

| DESIGNER | DESCRIPTION OF OPERATION |
|---|---|
| A | CREATION OF ELEMENT 1 |
| B | CREATION OF ELEMENT 3 |
| A | MODIFICATION OF ELEMENT 1 |
| B | MODIFICATION OF ELEMENT 3 |
| A | CREATION OF ELEMENT 2 |
| B | CREATION OF ELEMENT 4 |
| A | DELETION OF ELEMENT 2 |

Fig. 30 PRIOR ART

| TIME OF DAY | OBJECT | OPERATION |
|---|---|---|
| T1 | ELEMENT 1 | CREATION |
| T2 | ELEMENT 3 | CREATION |
| T3 | ELEMENT 1 | MODIFICATION |
| T4 | ELEMENT 3 | MODIFICATION |
| T5 | ELEMENT 2 | CREATION |
| T6 | ELEMENT 4 | CREATION |
| T7 | ELEMENT 2 | DELETION |

Fig. 31 PRIOR ART

CAD SYSTEM FOR TEAM-BASED DESIGN FOR MANAGING UNDO AND REDO FUNCTIONS

BACKGROUND OF THE INVENTION

1. Field of the Invention

The present invention relates to a CAD system to be used in team-based design, and particularly to improvements in undo and redo functions that the CAD system provides.

2. Description of the Related Art

Heretofore, when designing a relatively large apparatus having a large number of parts, such as an automobile, the exterior of the automobile to be designed is divided into a plurality of components as design units, and thereafter the various components are designed concurrently, namely, a team-based CAD system is adopted. In the CAD system to be used for this team-based design, a plurality of designers concurrently perform the design of the various components at various data processing terminals to achieve more efficient overall design and shorter design times. Furthermore, when each component contains a plurality of parts, the design of each component is assigned to designers and a team is formed for each component. Since each designer performs design tasks on individual terminals in this manner, all design details must be ultimately organized. By preparing a common component database in advance for each team designing one component and by having the designers in the team access the component database, savings in disk space and prevention of potential problems with other designers are achieved.

Furthermore, in the CAD system, CAD commands, such as design, modify, delete, and move, are executed by the operation of a keyboard or mouse, and while these operations can be reflected in the component database, a function is included to collect history information for each operation. For example, if a designer A and a designer B belonging to the same team concurrently perform operations in the procedure shown in FIG. 30 on separate terminals, these operations are recorded in sequence as history information in a history database provided to correspond to the component database and not particularly related to the designers. An example of the contents of this recorded history information is shown in FIG. 31. Although FIG. 31 is shown as a table for convenience, each type of history information is generated as a history object. Each "element" given in the figure refers to a graphic form to be drawn by a single command, such as line, circle, or square, and as a rule, one command is executed per operation and one graphic form is drawn. A single component is normally designed from combining a plurality of elements.

There are instances when it is desirable to cancel the drawn element in one operation. In general CAD systems, an undo function for canceling the last operation and a redo function for recovering the element canceled by the undo function are provided so as to improve the designing efficiency.

Heretofore, however, the operated procedure has been recorded in the history database as history information of the combined operations by different designers so that if, for example, designer B wishes to cancel the operation of "creation of element 4" in a state where the operations given in FIG. 30 have been performed, the conventional undo function must be executed twice in accordance with the history information recorded in the history database shown in FIG. 31. Namely, designer B cannot cancel the operation of "creation of element 4" unless the operation of "deletion of element 2" performed by designer A is canceled with the undo function. Therefore, the operation of "creation of element 4" cannot be canceled using the undo function if designer A does not acknowledge the cancellation of the operation of "deletion of element 2".

Therefore, in the prior art, even if one wishes to cancel only one's last operation among the operations executed by designers in the same team and sequentially recorded in a mixed state, valid operations must also be canceled through use of the undo function. Alternatively, in the case where an element is returned to its original state if the undo function is executed, a new design task is performed corresponding to the execution of the undo function and is not efficient.

SUMMARY OF THE INVENTION

The present invention is intended to solve the above-mentioned problems, the object of which is to provide a CAD system for team-based design for providing the undo function, which allows the cancellation of operations on a designer basis, and the redo function, which redoes the operation canceled by the undo function on a designer basis.

In order to achieve the above-mentioned object, the CAD system for team-based design concerning the present invention comprises means for providing the undo function to sequentially record the contents of operations performed by each designer in design tasks, which a plurality of designers are to perform in teams, as history information into common history information storing means, and to cancel the last operation based on the order of the history information recorded in the history information storing means, history information collecting means for recording to the history information storing means, each time the designer performs an operation, history information, which includes information on the time the operation was performed, elements included in the design for which the operation was performed, the type of operation, the designer who performed the operation, and information representing the validity or invalidity of the operation that was set to valid, and undo function control processing means for canceling the operation that is the object when the undo function is executed and for changing to invalid the information representing the validity or invalidity of the operation corresponding to history information of the corresponding operation that has been recorded in the history information storing means. The undo function control processing means cancels the last operation that the operator performed when the operator executes the undo function.

Furthermore, the undo function control processing means is characterized by canceling, in accordance with mode selection by the designer when the designer executes the undo function, either the last operation performed by the relevant designer or the last operation according to the time of operation.

Furthermore, the CAD system comprises redo function control processing means for redoing an operation that was canceled by execution of the last undo function when the redo function is executed and for changing to valid the information representing the validity or invalidity of the operation corresponding to the history information of the relevant information that is recorded in the history information storing means, and is characterized by redoing the operation that was canceled by the designer executing the last undo function as a result of searching the history information storing means when the relevant designer executes the redo function.

Furthermore according to the mode selection by a designer when the designer executes the redo function, the redo function control processing means is characterized by redoing either the operation that was canceled by execution of the undo function by the relevant designer or the operation that was canceled by execution of the last undo function according to the time the undo function was executed.

Furthermore, the history information collecting means is characterized by managing the history information regarding one operation by grouping according to time base reference, element, and designer.

According to the present invention, the last operation performed by a designer who executed the undo function among the operations performed by the designer in a team can be retrieved and canceled.

Similarly, the designer who executed the redo function can restore the operation that was canceled by execution of the last undo function.

According to the present invention, when a designer executes the undo function, only the last operation that the designer performed can be canceled without canceling an operation by another designer in the same team.

Furthermore, when a designer executes the redo function, only the operation that the designer canceled by execution of the last undo function can be redone without redoing an operation of another designer in the same team.

Furthermore, in addition to the execution of the undo function and redo function per designer, the same functions with reference to the conventional time base can also be selectively executed.

BRIEF DESCRIPTION OF THE DRAWINGS

FIG. 7 conceptually shows the settings of the history database and history database manager prior to the start of design in the present embodiment.

FIG. 30 shows a procedure of operation by designers.

FIG. 31 shows an organization example of a conventional database.

DETAILED DESCRIPTION OF THE PREFERRED EMBODIMENTS

A preferred embodiment of the present invention will be described hereinafter with reference to the drawings.

Figure 1:
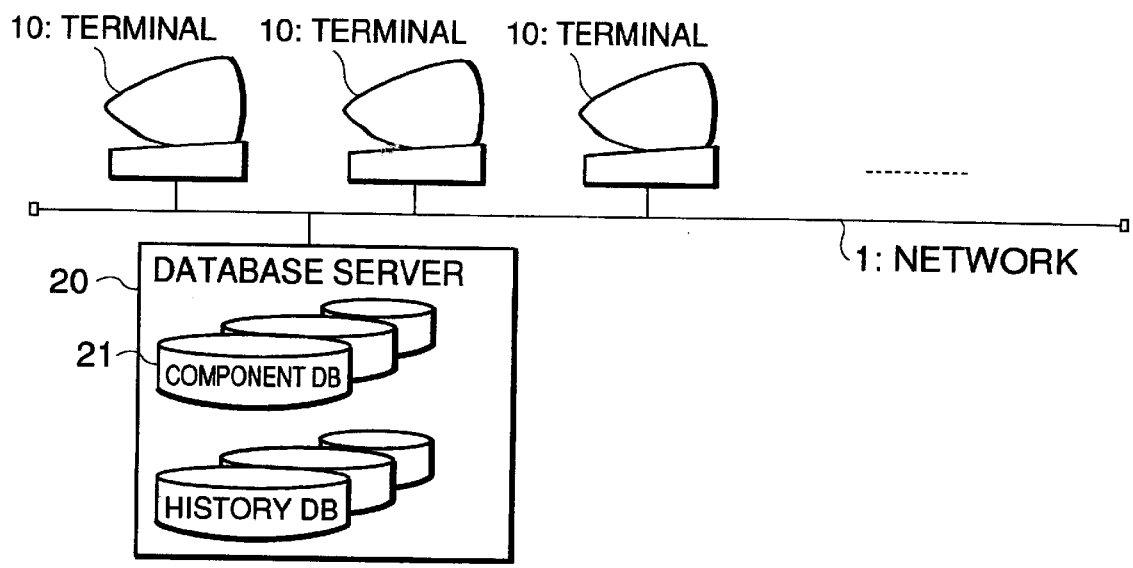
FIG. 1 is a block diagram showing an embodiment of a CAD system for team-based design concerning the present invention.

FIG. 1 is a block diagram showing an embodiment of the CAD system concerning the present invention. Terminals 10, which various designers use and which are connected through a network 1, and a database server 20 for managing various types of databases shared by the designers are shown in FIG. 1.

Figure 2:
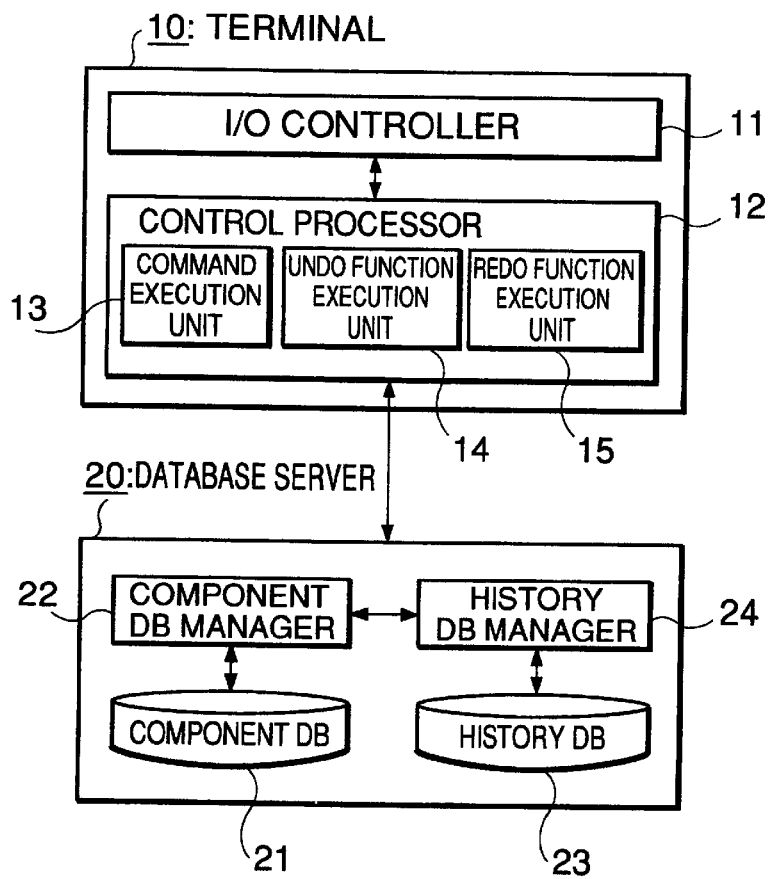
FIG. 2 gives block diagrams of a terminal and a database server shown in FIG. 1.

FIG. 2 show block diagrams of each terminal 10 and the database server 20 shown in FIG. 1. The terminal 10 comprises an I/O controller 11 for controlling various I/O devices, such as a mouse and a display (which are not shown), and a control processor 12 for performing other general control operations in the terminal 10. The control processor 12 includes a command execution unit 13 for executing CAD commands instructed by the designer, an undo function execution unit 14 for executing the undo function, and a redo function execution unit 15 for executing the redo function. The terminal 10 can be implemented through hardware with a general-purpose CAD terminal while the application to be executed on the terminal differs from the prior art. In the present embodiment, the applications are created by shape data objects representing shape data of various elements, such as lines and circles, and application objects, such as display objects on the display screen representing elements.

The database server 20 manages databases storing data with regard to shapes to be designed, and in the present embodiment manages a component database (DB) 21 provided for the shape database since designs are performed by component in a team. The component DB 21 is an object-oriented database and stores shape data objects of components or parts. A component database (DB) manager 22 performs an update process for the component DB 21 on the basis of the shape data objects generated or deleted by execution of CAD commands. Furthermore, together with the registration of the shape data object, the component DB manager 22 instructs a history database (DB) manager 24 to record history information. The history DB manager 24 is history information collection means for collecting the history of operations that a designer performs during the design process and for sequentially recording the history information into a history database (DB) 23. The history DB manager 24 forms, with the undo function execution unit 14, undo function control processing means for canceling an operation that is the object when the undo function is executed and for changing the information representing the validity or invalidity of the operation corresponding to history information of the relevant operation that has been recorded in the history DB 23 to invalid. Furthermore, the history DB manager 24 forms, with the redo function execution unit 15, redo function control processing means for redoing the operation that was canceled by execution of the last undo function when the redo function was executed and for changing the information representing the validity or invalidity of the operation corresponding to history information of the relevant operation that has been recorded in the history DB 23 to valid.

Figures 3, 4:
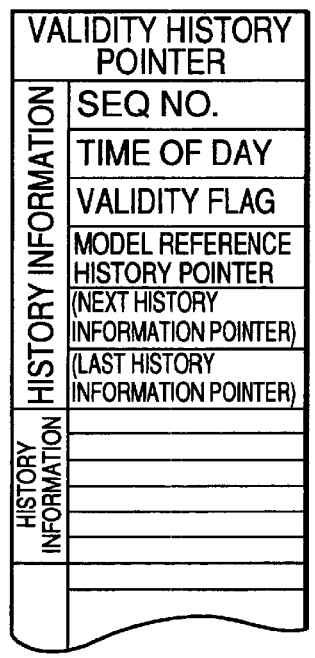
FIG. 3 shows an example of basic data organization of the history database in the present embodiment.
FIG. 4 shows an organization example of time base reference history management table in the history database in the present embodiment.

FIG. 3 shows an example of a basic data organization of the history DB 23 in the present embodiment. Each time a designer performs an operation, information regarding the operation is stored into the history DB 23 as history information. Each history information item includes information on the time the operation was performed, the elements included in the design for which the operation was performed, the type of operation, such as creation or modification, the designer who performed the operation, and information representing the validity or invalidity of the operation. These are respectively represented in FIG. 3 by "time of day", "object", "operation", "designer", and "validity flag". The validity flag is set to "valid" when a new record is made or when an operation is redone and validated by execution of the redo function, or set to "invalid" when an operation is canceled by execution of the undo function. Although the validity or invalidity of an operation is represented in the present embodiment by flag information called the "validity flag", another representation method, such as representing it with pointer information, is also possible.

A characteristic of the present embodiment allows the undo function and redo function to be executed by each designer by having information regarding the designer in the history information. For example, if designer B wishes to cancel the operation of "creation of element 4" after the operations in the procedure shown in FIG. 30 are performed, designer B can cancel only his own operation of "creation of element 4" without canceling the operation of "deletion of element 2" that designer A performed by executing the undo function once.

The undo function and redo function based on the time of operation as in the prior art, namely, the time base reference, and the undo function and redo function for each designer who performed an operation, which are characteristics of the present embodiment, can be concurrent in the present embodiment. Since each function is realized in the present embodiment as an object, the history DB 23 is actually realized with a data organization that is different from that shown in FIG. 3 so as to facilitate implementation. The data organization of the history DB 23 used in the present embodiment will be described.

Figure 5:
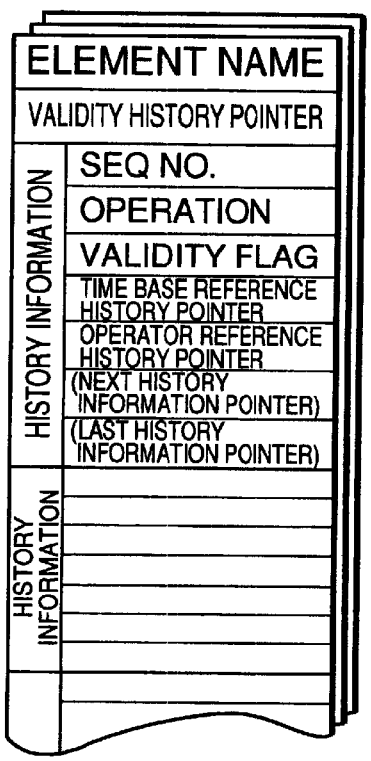
FIG. 5 shows an organizational example of model reference history management table in the history database in the present embodiments.
Figure 6:
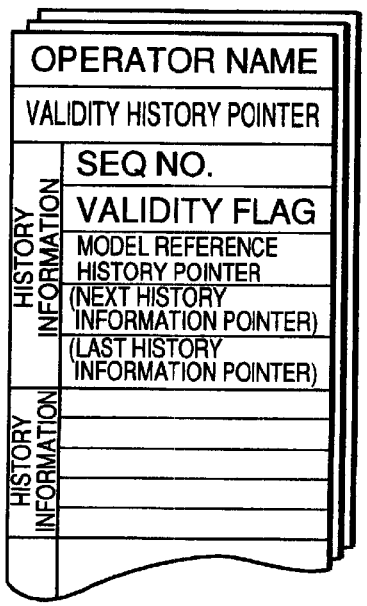
FIG. 6 shows an organizational example of operator reference history management table in the history database in the present embodiment.

In the present embodiment, the history information is divided and managed according to three references. One is history information with the time base as the reference. This is shown in FIG. 4 in a tabular format and referred to as the time base reference history management table. Another one is history information with the element for the operation as the reference. This is shown in FIG. 5 in a tabular format and referred to as the model reference history management table. The final one is history information with the designer performing the operation as the reference. This is shown in FIG. 6 in a tabular format and referred to as the operator reference history management table. FIGS. 4 to 6 are represented in tabular formats for convenience, while each history information item is formed as a single object. Each time a designer performs an operation, history information is respectively linked and recorded to the tables.

First, the history information of the time base reference history management table includes "Seq No." indicating the recorded order, "time of day" indicating the time the operation was performed, "validity flag" for information representing the validity or invalidity of the operation corresponding to the relevant history information, "model reference history pointer" for linking with the history information in the model reference history management table recorded in correspondence with the relevant history information, "next history information pointer" linking the history information recorded next in the time base reference history management table, and "last history information pointer" linking the history information recorded last in the time base reference history management table. The "next history information pointer" and the "last history information pointer" are not always necessary if each history information is a fixed length and forms a consecutive area. If each history information item can be linked in a time order of operations performed, another method may be employed. As a rule, the history information, once recorded, is not deleted even if canceled with the undo function. Thus, a "validity history pointer" is provided to make it easy to determine until which operation is valid without having to check the "validity flag". Namely, the validity history pointer points to history information located at the end of a valid history information sequence. Although the present system can be operated normally by setting either the "validity history pointer" or "validity flag", the present embodiment provides both items of information in order to speed up processing. The last valid operation can be easily indicated if the "Seq No." of the history information is set to the "validity history pointer". Each time an operation is performed, history information is stored in the time base reference history management table. The time information ("time of day" in this example) and information ("model reference history pointer" in this example) for linking with the history information of another table are necessary data in the history information.

The table shown in FIG. 5 is generated for each element in the model reference history management table. The history information includes "operation" indicating the type of operation, such as creation or modification, "time base reference history pointer" for linking with history information in the time base reference history management table that was recorded in correspondence with the relevant history information, and "operator reference history pointer" for linking with history information in the operator reference history management table that was recorded in correspondence with the relevant history information. The other "validity history pointer" and history information of "Seq No.", "validity flag", "next history information pointer", and "last history information pointer" are identical with those of the time base reference history management table so their descriptions will be omitted. The information ("time base reference history pointer" and "operator reference history pointer" in this example) for linking the "element name" corresponding to "object" in FIG. 3 with the history information of another table is necessary data in the model reference history management table.

The table shown in FIG. 6 is generated for each designer in the operator reference history management table. The "Seq No.", "validity flag", "model reference history pointer", "next history information pointer", and "last history information pointer" are included in the history information and are identical with those of the above-mentioned tables so their descriptions will be omitted. The information ("model base reference history pointer" in this example) for linking the "operator name" identical to "designer" in FIG. 3 with the history information of another table is necessary data in the operator reference history management table. The history information in the time base reference history management table may be indirectly linked via the history information in the model reference history management table, or the "time base reference history pointer" may be directly included in the history information.

Next, the operations of the present embodiment will be described with reference to the drawings from FIG. 7, which conceptually illustrate the contents of the objects shown in the tabular formats in FIGS. 4 to 6, in the case where as a result of the operations performed in the procedure shown in FIG. 30, the history information is recorded into the history DB 23 and the undo function and the redo function are executed thereafter. In the present embodiment, it is assumed that designers (operators) A and B form a team.

First, the component DB 21 and the history DB 23, which are shared by the team, are prepared for designers A and B prior to the start of design. A time base reference history management object 30 in FIG. 7 corresponds to the "validity history pointer" in the time base reference history management table shown in FIG. 4, and an operator reference history management object 50 for each designer corresponds to the "operator name" and "validity history pointer" in the operator reference history management table shown in FIG. 6. A model reference history management object 40 to be described later corresponds to the "element name" and "validity history pointer" in the model reference history management table shown in FIG. 5. Recording of History Information into the History DB First, the operation to record the history information into the history DB 23 will be described with reference to transition diagrams of history information conceptually shown in FIGS. 8 to 14 and the flowchart shown in FIG. 15.

Figure 8:
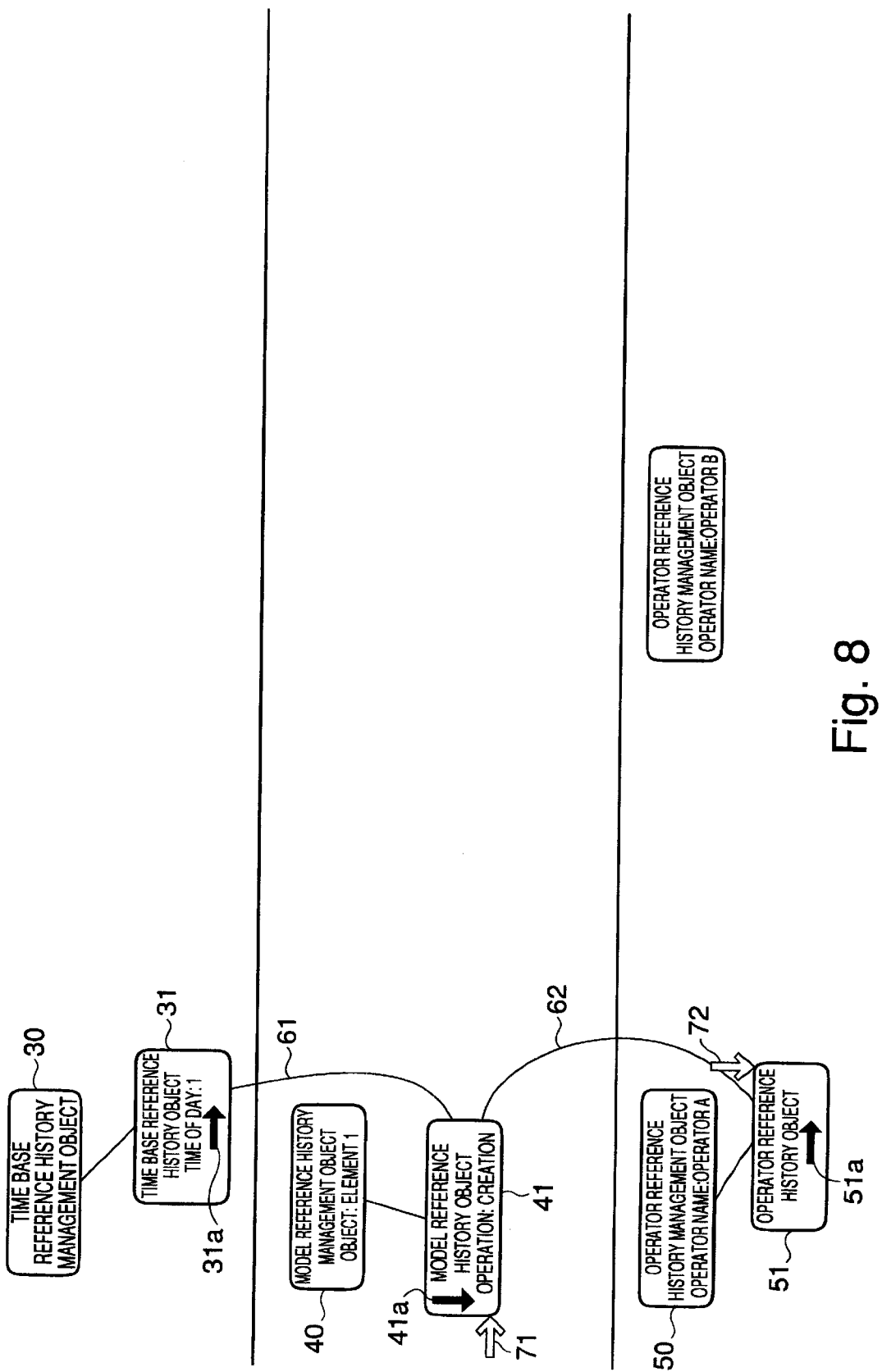
FIG. 8 conceptually shows the settings of the history information recorded in the present embodiment.

The command execution unit 13 interprets the operation of "creation of element 1" by designer A and generates a shape data object, which is transmitted to the database server 20 via the network 1. The component DB manager 22 registers the received shape data object into the component DB 21. Furthermore, the history DB manager 24 is notified of the registration together with information regarding the operation of "designer A created element 1". The history DB manager 24 records the history information based on the contents of the received notice into the history DB 23. Namely, as shown in FIG. 8, a time base reference history object 31, a model reference history object 41, and an operator reference history object 51 respectively corresponding to the history information in the above-mentioned three types of tables are generated (steps 101, 104, and 106).

First, in step 101, the time base reference history object 31 is generated by setting the time of operation to "time of day" and "valid" to the "validity flag", although in the present embodiment, the information for the time of day will be represented simply by the recorded order corresponding to "Seq No.". A right arrow 31a indicates that the "validity flag" is "valid". The time base reference history object 31 generated in this manner is managed by the time base reference history management object 30.

Next, if the element to be processed is new, the history DB manager 24 internally generates the model reference history management object 40 for the relevant element accompanying the notice and initiates operation (steps 102 and 103). In this example, the model reference history management object 40 for element 1 is generated internally. In step 104, "creation" is set to "operation" and "valid" is set to the "validity flag" in the model reference history object 41, although in the present embodiment, a downward arrow 41a indicates that the "validity flag" is "valid". A link is then made to the model reference history management object 40 for element 1, and the end of the object (namely, model reference history object 41) corresponding to a valid operation in the model reference history object sequence for element 1 is furthermore indicated by an arrow 71 (step 105). The arrow 71 corresponds to the validity history pointer of the model reference history management table. The model reference history object 41 generated in this manner is managed by the corresponding model reference history management object 40.

When the undo function is executed, it is necessary for the element, for which an operation was performed, to return to its original state. In other words, it is necessary to return the shape data object to the state immediately prior to a given operation. When the redo function is executed, it is further necessary to redo the element that was returned to its original state due to the execution of the undo function. This is achieved in the present embodiment by linking, each time an operation is performed, backup status information regarding the element for which the operation is performed, to a model reference history object. However, since this process is not the purport of the present invention, its description will be omitted.

In step 106, the "validity flag" is set to "valid" in the operator reference history object 51, although in the present embodiment, a right arrow 51a indicates that the "validity flag" is "valid". The operator reference history object 51 is linked to the operator reference history management object 50 for operator A, and furthermore the end of the object sequence corresponding to a valid operation in the operator reference history object sequence for operator A (namely, operator reference history object 51) is indicated by an arrow 72 (step 107). This arrow 72 corresponds to the validity history pointer of the operator reference history management table. The newly recorded history objects 31, 41, and 51 are linked by the time base reference history pointer, model reference history pointer, and operator reference history pointer as described regarding the above-mentioned tables with reference to FIGS. 4 to 6. These links are represented by lines 61 and 62 in FIG. 8.

Figure 9:
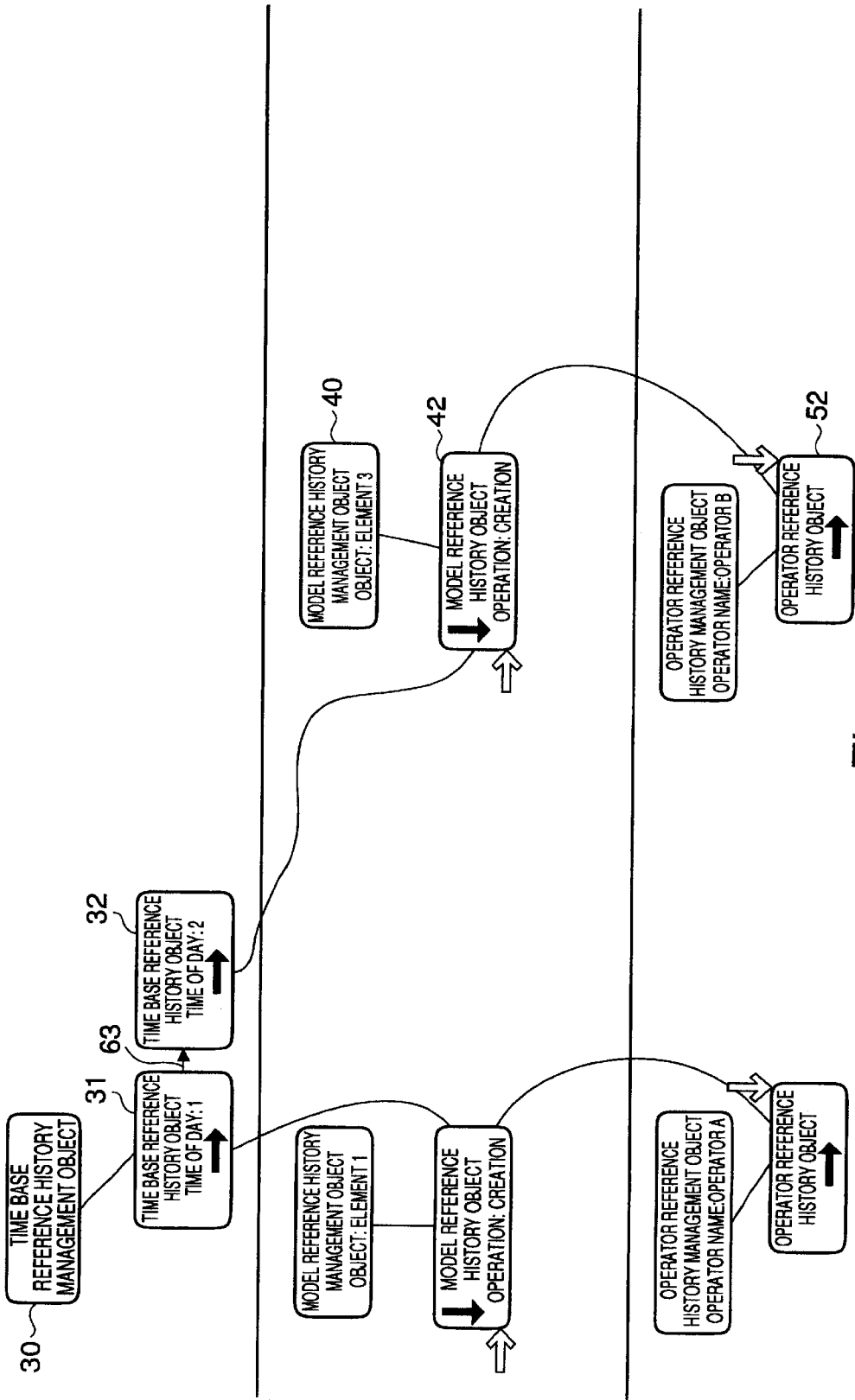
FIG. 9 conceptually shows the settings of the history information recorded in the present embodiment.

The command execution unit 13 interprets the operation of "creation of element 3" by designer B and generates a shape data object, which is transmitted to the database server 20 via the network 1. The component DB manager 22 registers the received shape data object into the component DB 21. Furthermore, the history DB manager 24 is notified of the registration together with information regarding the operation of "designer B created element 3". The history DB manager 24 records history information based on the contents of the received notice into the history DB 23. Namely, as shown in FIG. 9, a time base reference history object 32, a model reference history object 42, and an operator reference history object 52 respectively corresponding to the history information in the above-mentioned three types of tables are generated (steps 101, 104, and 106). The process for setting the contents thereof is identical to the above-mentioned process.

The time base reference history object 32 generated in step 101 is first linked immediately after the already recorded time base reference history object 31. Information corresponding to the next (last) history information pointer of the time base reference history management table is represented by a line 63. It should be noted that the method of setting the contents of the time base reference history object 32 is identical to the above-mentioned method.

Next, since the element 3 to be the object of the process is new, the model reference history management object 40 for element 3 is generated internally and initiates operation (steps 102 and 103). It should be noted that the method of setting the contents of the model reference history object 42 and the validity history pointer is identical to the above-mentioned method.

The generation of the operator reference history object for operator B is performed in the same manner as the above-mentioned operation of "creation of element 1" by designer A (steps 106 and 107).

Figure 10:
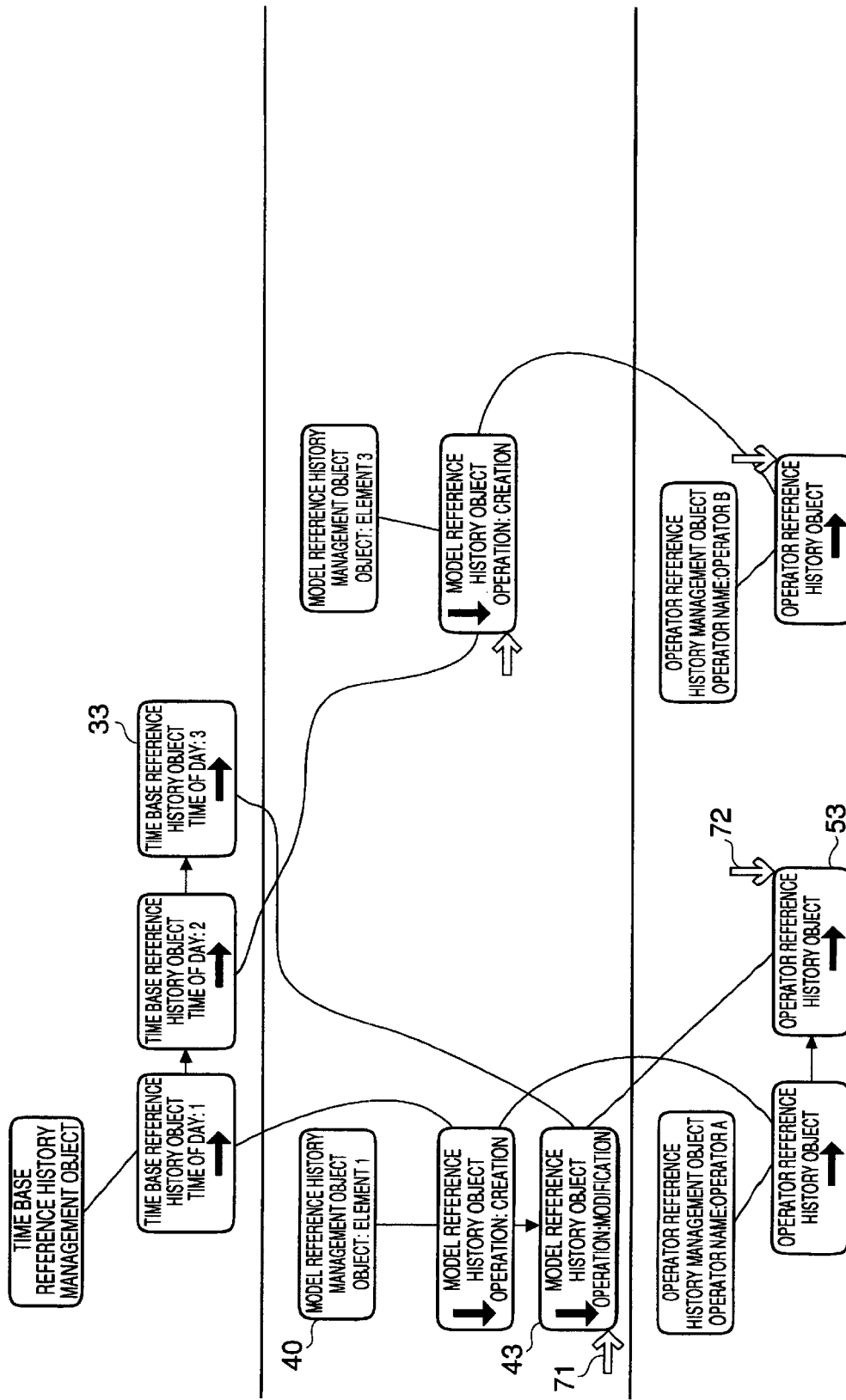
FIG. 10 conceptually shows the settings of the history information recorded in the present embodiment.
Figure 11:
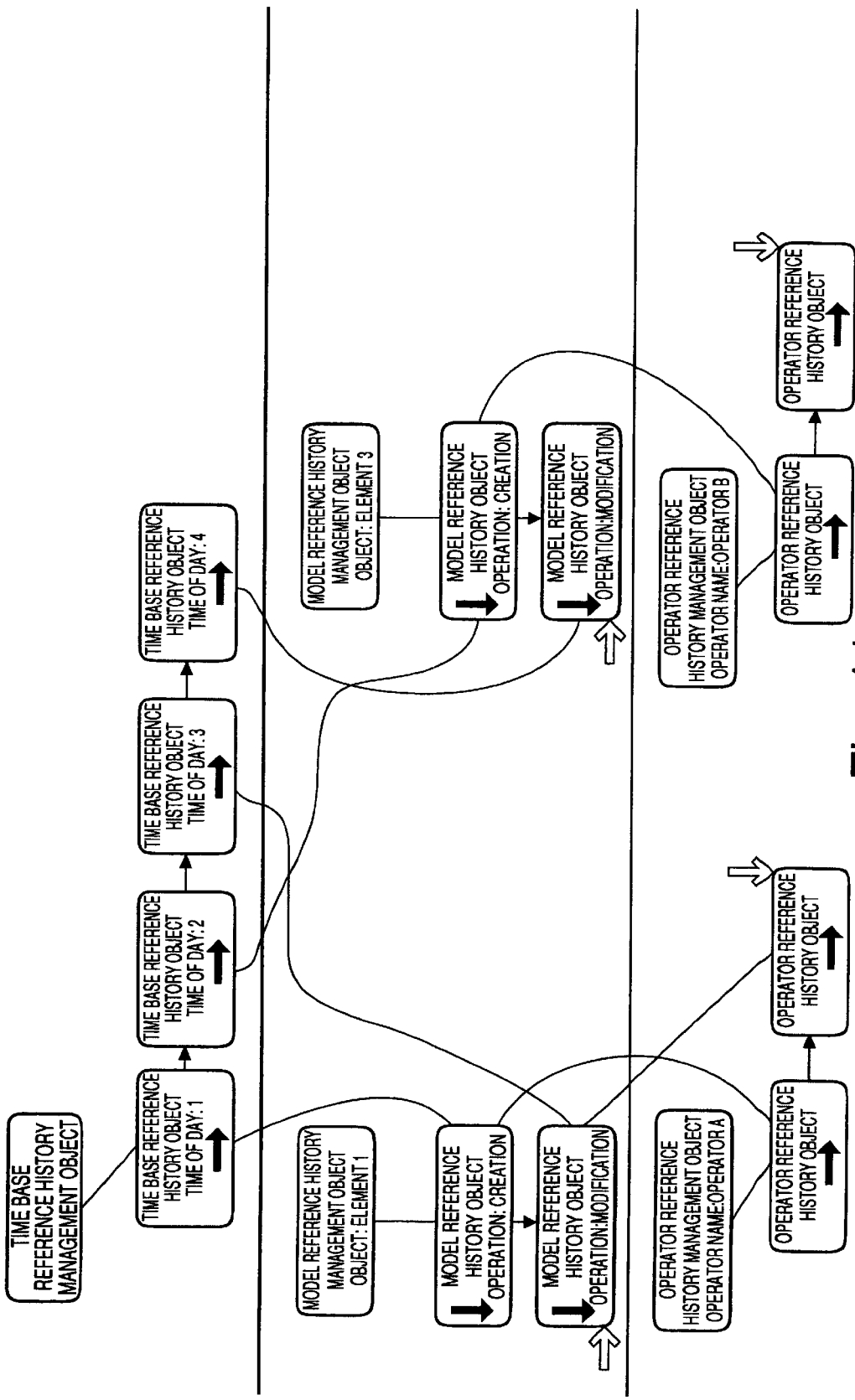
FIG. 11 conceptually shows the settings of the history information recorded in the present embodiment.
Figure 12:
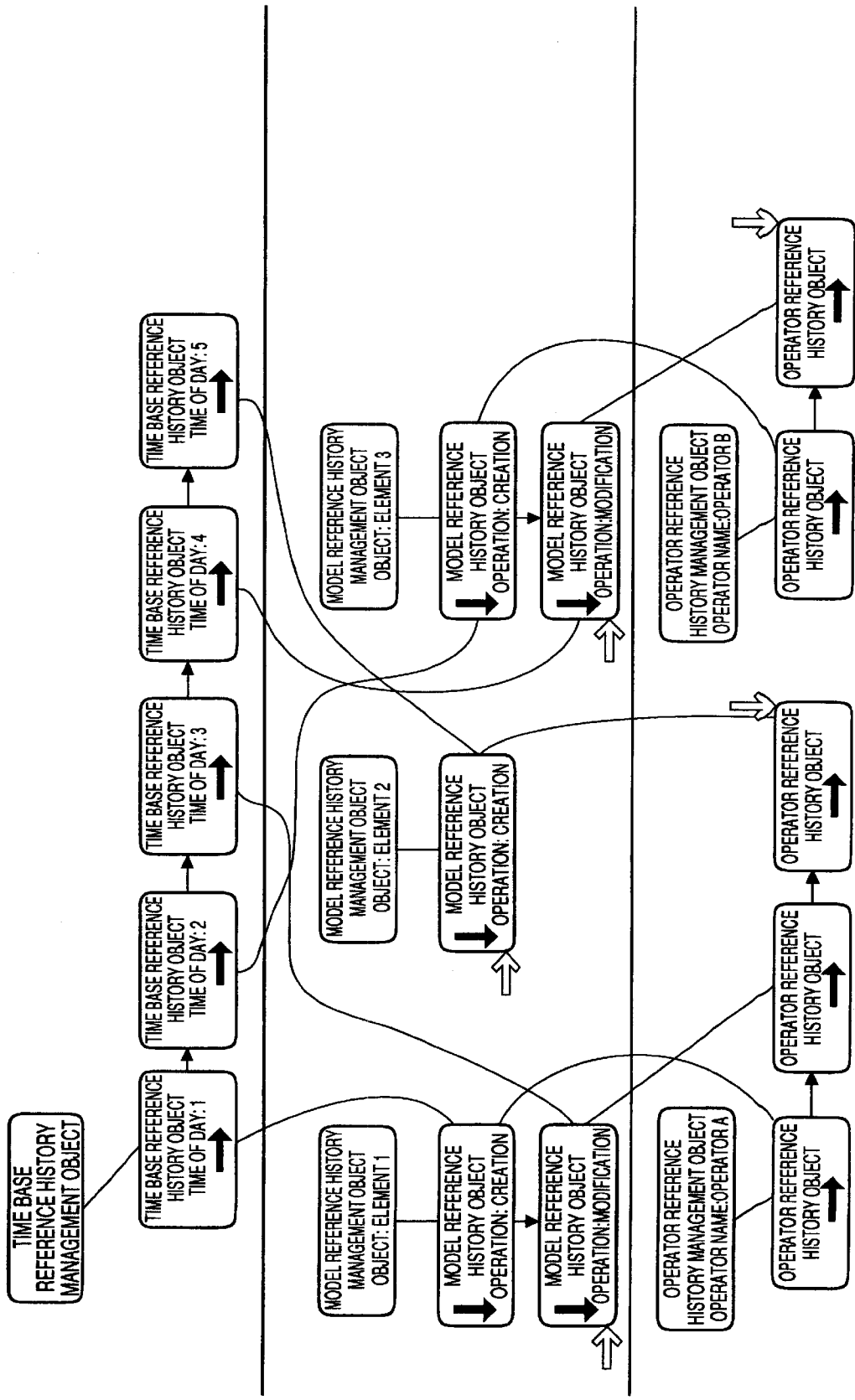
FIG. 12 conceptually shows the settings of the history information recorded in the present embodiment.
Figure 13:
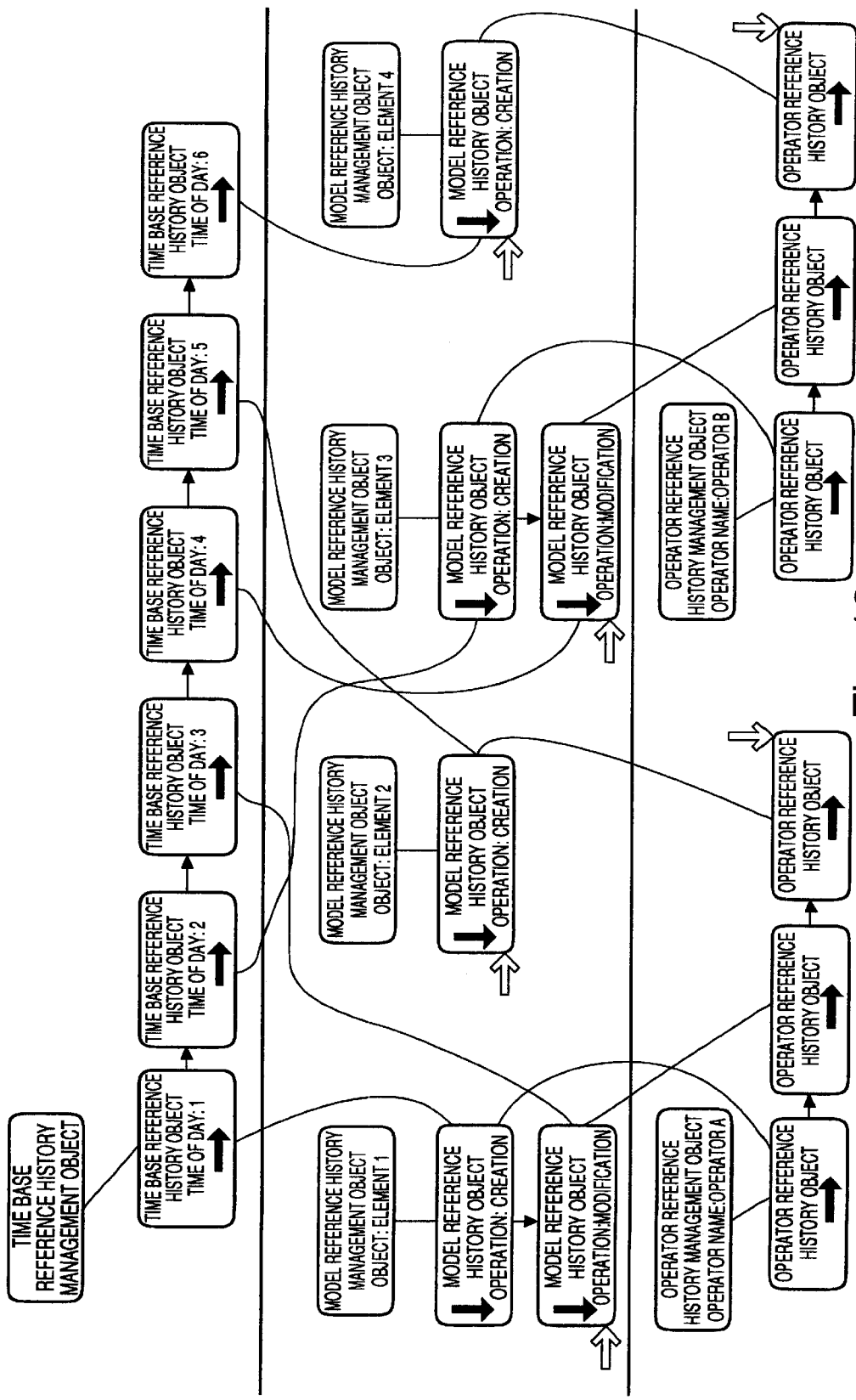
FIG. 13 conceptually shows the settings of the history information recorded in the present embodiment.

Next, the command execution unit 13 interprets the operation of "modification of element 1" by designer A and generates a shape data object, which is transmitted to the database server 20 via the network 1. The component DB manager 22 registers the received shape data object into the component DB 21. Furthermore, the component DB manager 22 notifies the history DB manager 24 of the registration together with information regarding the operation of "designer A modified element 1". The history DB manager 24 records the history information based on the contents of the received notice into the history DB 23. Namely, as shown in FIG. 10, a time base reference history object 33, a model reference history object 43, and an operator reference history object 53 respectively corresponding to the history information in the above-mentioned three types of tables are generated (steps 101, 104, and 106). The contents of the respective history objects 33, 43, and 53 are set in an identical manner as described above. In the time base reference history object 33 are set the time an operation was performed into "time of day" and "valid" into the "validity flag" (step 101). A link is then made to the end of the history object that the time base reference history object 43 manages. In the model reference history object 43 are set "modification" into the "operation" and "valid" into the "validity flag" (step 104). Since the model reference history management object 40 for element 1 has already been generated, the model reference history object 43 is linked to the end of the history object that the model reference history management object 40 for element 1 manages, and also the arrow 71 corresponding to the validity history. pointer moves to the model reference history object 43 (stop 105). In the operator reference history object 53 is set "valid" into th "validity flag" (step 106). The operator reference history object 53 is linked to the end of the history object that the operator reference history management object 53 for operator A manages, and also the arrow 72 corresponding to the validity history pointer moves to the operater reference history object 53 (step 107). It should be noted that the processes to link with history information in another table and last history information are performed in the same manner as mentioned above.

The history information corresponding to the various operations from modification of element 3 to deletion of element 2 by designer B as shown in FIG. 30 to be described later can also be sequentially recorded into the history DB 23 by repetitively performing the above-mentioned process. The state showing the various objects recorded by subsequent operations is shown in FIGS. 11 to 14.

Execution of the Undo Function (Operator Reference Mode)

Figure 14:
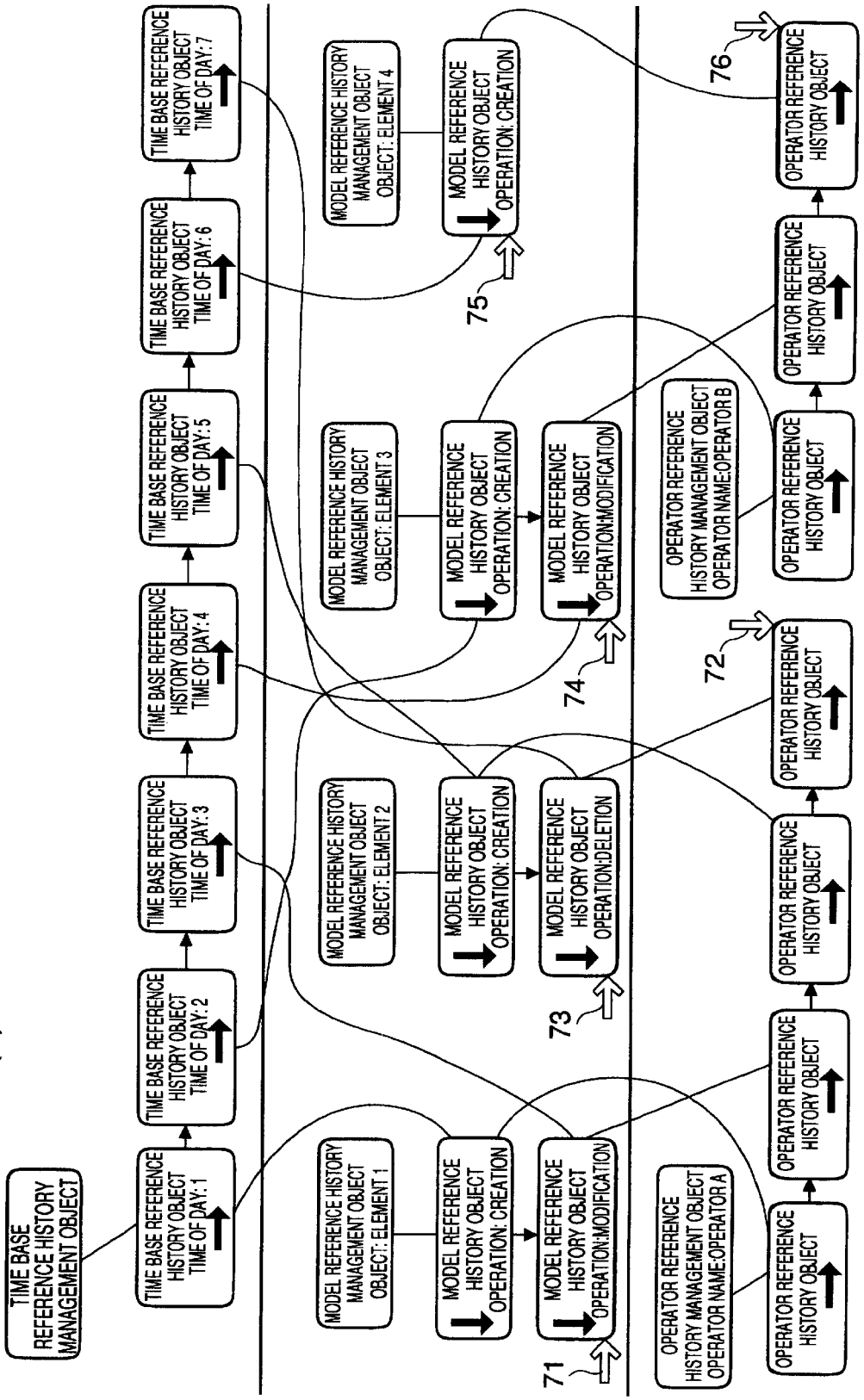
FIG. 14 conceptually shows the settings of the history information recorded in the present embodiment.
Figure 15:
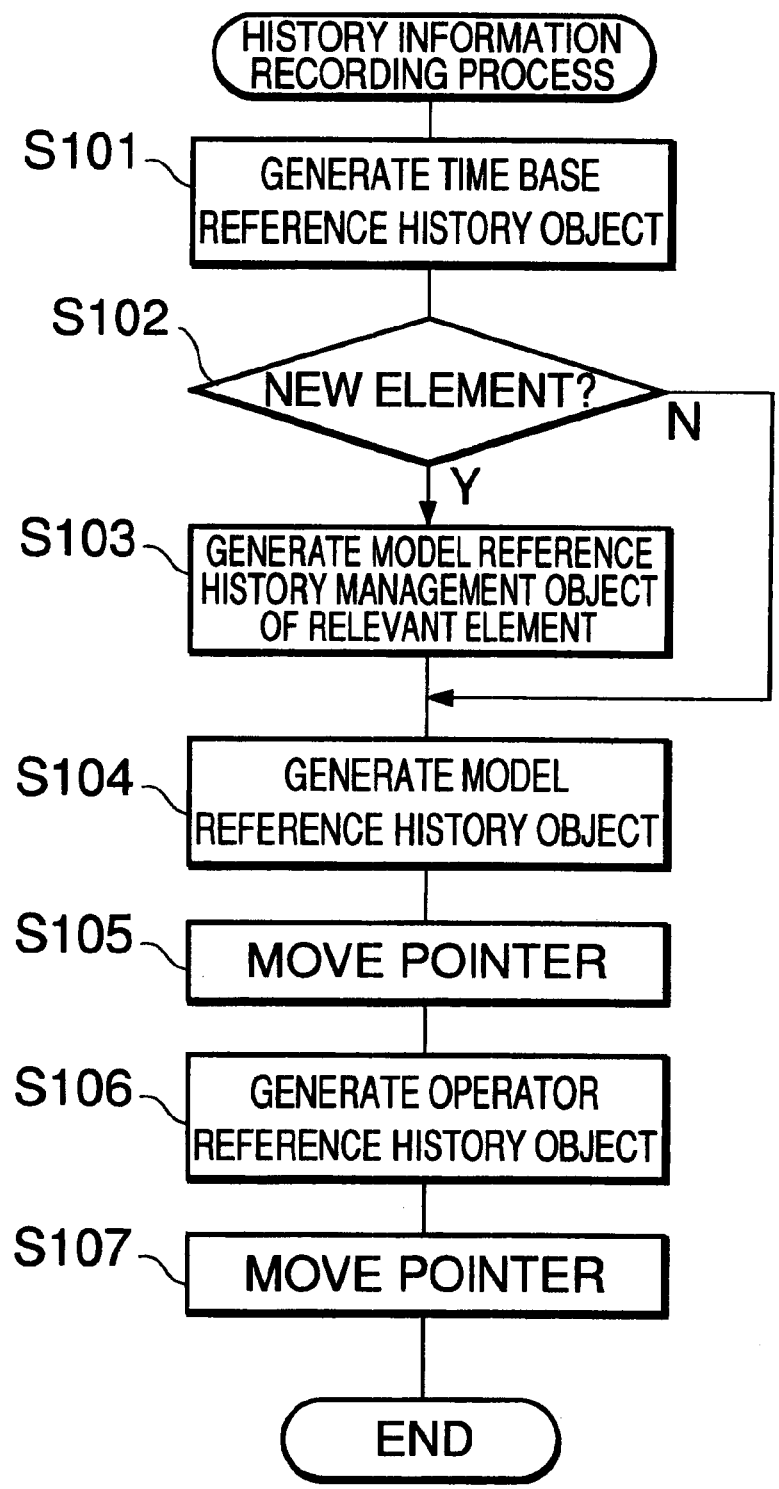
FIG. 15 is a flowchart showing the history information recording process in the present embodiment.

As described above, the present embodiment is characterized by allowing the undo function to be executed by each designer. Next, an operation in the present embodiment when the undo function is executed from the state where history information has been recorded as shown in FIG. 14 is described with reference to the transition diagrams of the history information conceptually shown in FIG. 14 and FIGS. 16 to 19 and the flowchart shown in FIG. 20. In the present embodiment, the undo function in the operator reference mode where the execution of the undo function is performed for each operator (designer) and the time base reference mode where the undo function is performed according to the time an operation was performed as in the prior art are provided. The process for the case where the operator reference mode was selected will be described herein.

First, the history information recorded in the history DB 23 prior to the execution of the undo function has the state shown in FIG. 14 and the validity flags of all history objects are set to "valid" so that the arrow 71 and arrows 73, 74, and 75 for the validity history pointers indicate the end of the model reference history object sequences in elements 1 through 4. Similarly, arrows 72 and 76 of the validity history pointers point to the end of the respective operator reference history object sequence.

Figure 16:
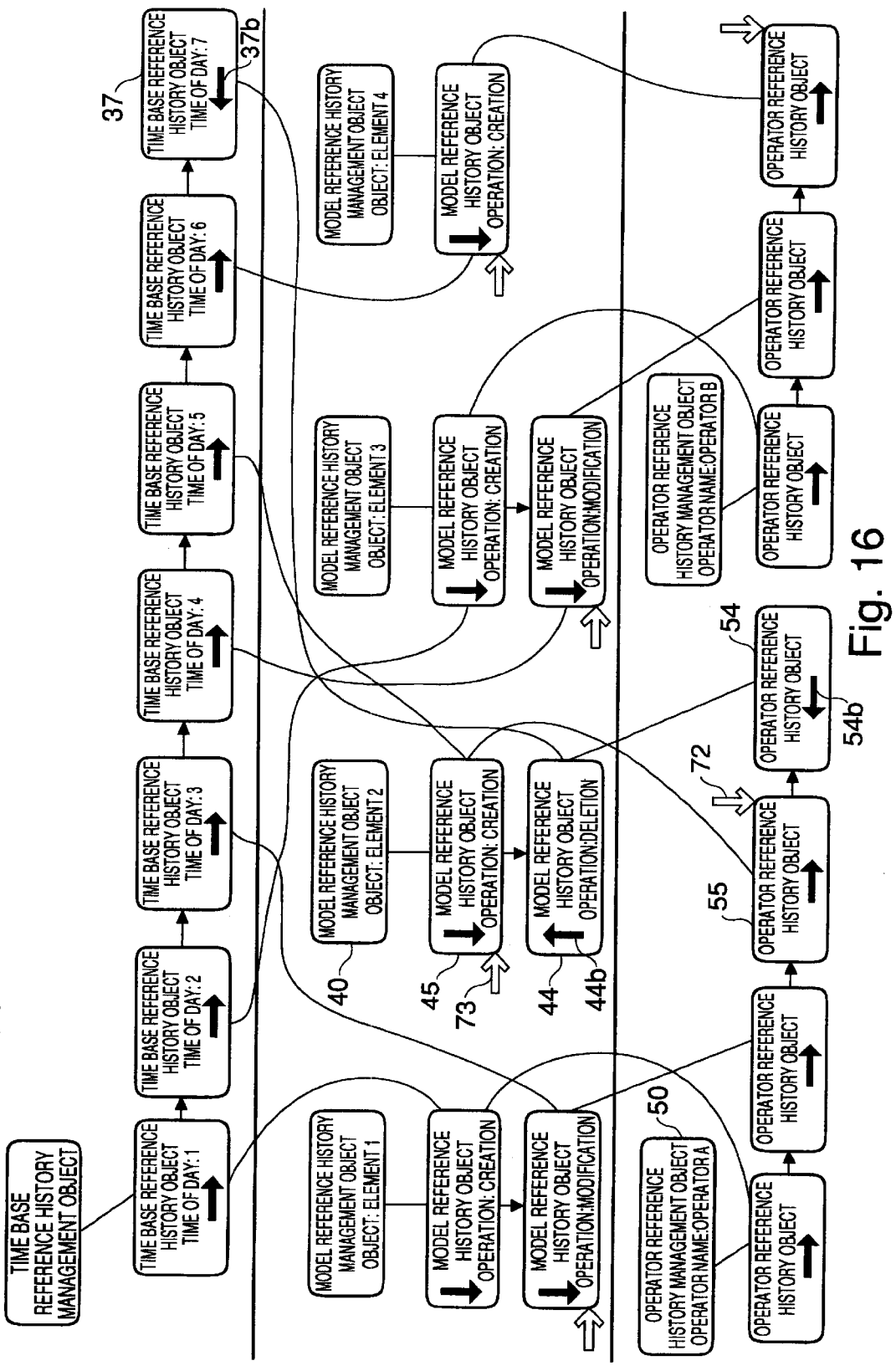
FIG. 16 conceptually shows the settings of the history information when the undo function was executed in the operator reference mode in the present embodiment.

It is assumed designer A executes the undo function in this state. This operation corresponds to the cancel command for the operation of "deletion of element 2" in this example according to FIG. 30. This operation is interpreted by the undo function execution unit 14 and transmitted to the database server 20 via the network 1. The contents of the transmitted operation include the designer name (=A) and the operation name (=undo). When executing the undo function, the history DB manager 24 searches for the operator reference history management object 50 for designer A (step 111). Moreover the history DB manager 24 searches for the validity flag, which is the end operator reference history object 54 of the operator reference history object sequence that the relevant operator reference history management object 50 manages, that is "valid", and changes the found flag to "invalid" (step 112). In the present embodiment, the relevant operator reference history object 54 is pointed to by the arrow 72 of the validity history pointer so that the relevant operator reference history object 54 can be retrieved instantly. In the present embodiment, a left arrow 54*b* indicates that the "validity flag" is "invalid". Next, the arrow 72 of the validity history pointer is moved to the operator reference history object 55, which is positioned immediately prior to the operator reference history object 54 for which the validity flag was not to "invalid" and is the end of the history information sequence for which the validity flag is "valid" (step 113). Next, the history information of the model reference history management table that is linked by the model reference history pointer of the invalidated history information (operator reference history object 54) in the operator reference history management table, namely, the validity flag of the model reference history object 44 linked from the model reference history management object 40 for element 2 in FIG. 16 is changed to "invalid" (step 114). In the present embodiment, an upward arrow 44*b* indicates that the "validity flag" is "invalid".

The component DB 21 is changed according to the case in the following manner through the component DB manager 22 using the status information immediately prior to execution of operation on the element for the undo function linked to the model reference history object and stored in the history DB 23 (step 115).

In the case of undo for the operation of "creation", it is assumed the shape data object does not exist. The shape data object is saved for future execution of the redo function. In the case of undo for the operation of "modification", the shape data object in the component DB 21 is changed using the backed up status information immediately prior to execution of an operation on the element for the undo function. In the case of undo for the operation of "deletion", the stored shape data object is again registered in a set of existing valid shape data objects. This example corresponds to the case of undo for the operation of "deletion". Thus, the redo is performed by again registering the shape data object of element 2 that was stored during the "deletion" operation into the set of valid shape data objects.

Next, the history DB manager 24 moves the arrow 73 of the valid history pointer to the model reference history object 45, which is positioned immediately prior to the model reference history object 44 for which the validity flag was set to "invalid" and is the end of the history information sequence for which the validity flag is "valid" (step 116). The history information of the time base reference history management table that is linked by the time base reference history pointer in the model reference history management table, namely, the validity flag of the time base reference history object 37 in FIG. 16 is changed to "invalid" (step 117). In the present embodiment, a left arrow 37*b* indicates that the "validity flag" is "invalid".

As described above, when the undo function is executed, only a process for invalidating the validity flag of the corresponding history object for the history DB 23 and a process for moving the validity history pointer are performed. The above-mentioned processes are performed during execution of the undo function in the operator reference mode. Thus, the movement of the validity history pointer that the time base reference history management object 30 manages is not a necessary process.

Next, it is assumed that designer A successively executes the undo function. This operation corresponds to the cancellation of the operation of "creation of element 2" in the example according to FIG. 30. Once this operation is performed, the history DB manager 24 is notified of information on "designer A canceled the operation of 'creation of element 2'", and executes the following process.

First, the validity flag of the end operator reference history object 55, among the operator reference history object sequence that the operator reference history management object 50 for designer A manages and for which the validity flag is "valid", is changed to "invalid" (step 111). Next, the arrow 72 of the validity history pointer is moved to the operator reference history object 53, which is positioned immediately prior to the operator reference history object 55 for which the validity flag was set to "invalid" and is the end of the history information sequence for which the validity flag is "valid" (step 112).

Figure 17:
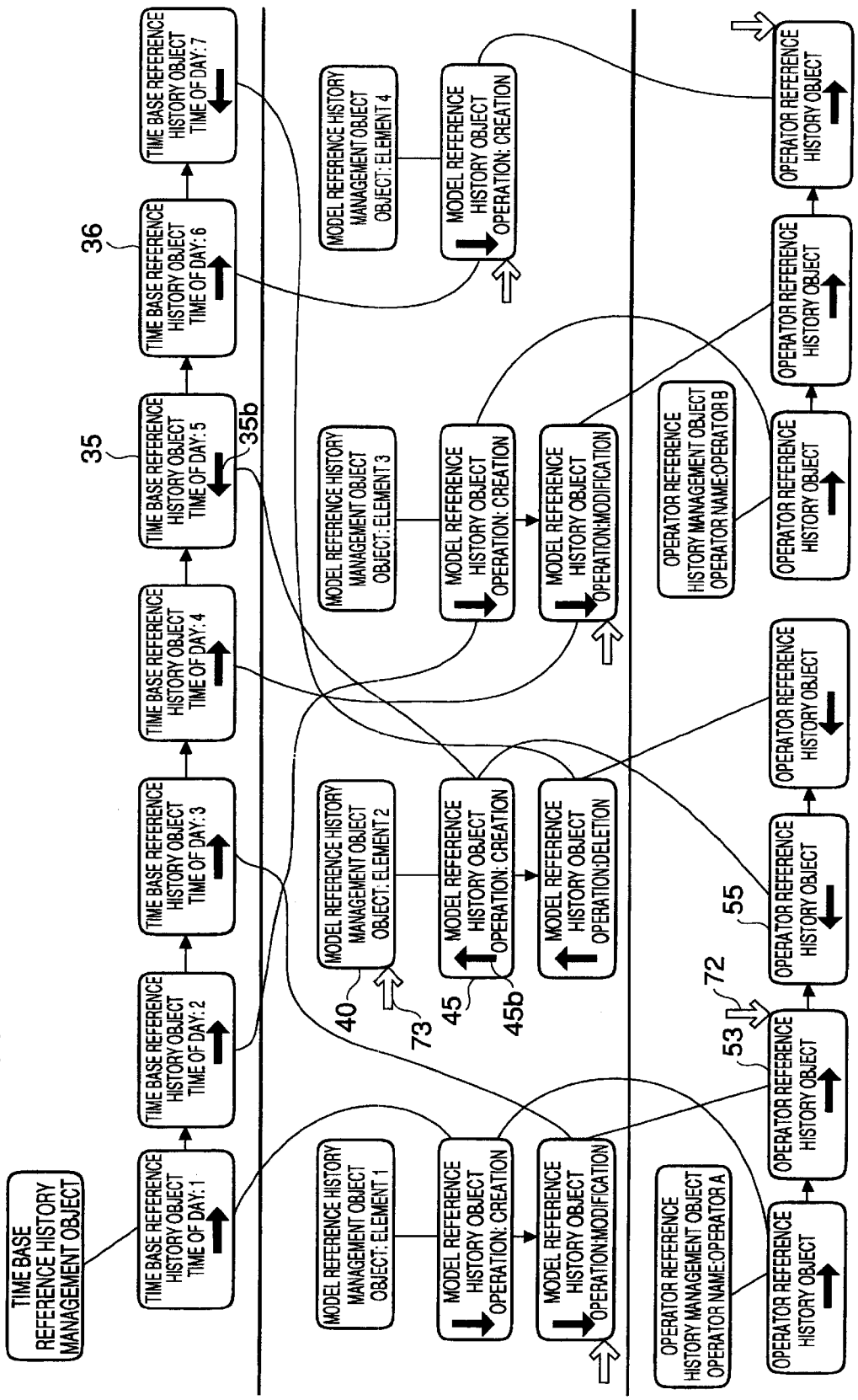
FIG. 17 conceptually shows the settings of the history information when the undo function wag executed in the operator reference mode in the present embodiment.

Next, the history information of the model reference history management table that is linked by the model reference history pointer of the invalidated history information (operator reference history object 55) in the operator reference history management table, namely, the validity flag of the model reference history object 45 linked from the model reference history management object 40 for element 2 in FIG. 17 is changed to "invalid" (step 114) Next, an attempt is. made to move the arrow 73 of the validity history pointer to the end of the history information sequence for which the validity flag is "valid" (step 116). Although the corresponding model reference history object does not exist here, an attempt is made to point to the model reference history management object 40 for element 2 in preparation for execution of the redo function. Of course, each model reference history object is recorded and retained as history information and not deleted. In the subsequent description, a model reference history object which the validity flag set to "valid/invalid" will be represented for convenience as a valid/invalid model reference history object.

Next, the history information of the time base reference history management table that is linked by the time base reference history pointer in the model reference history management table, namely, the validity flag of the time base reference history object 35 in FIG. 17 is changed to "invalid" (step 117).

According to the present embodiment, execution of the undo function by designer A only cancels the operation that designer A performed, and the operation of "creation of element 4" by designer B after the operation of "creation of element 2" by designer A remains valid as indicated by the time base reference history object 36 that is linked to the time base reference history management object 30.

Next, it is assumed that designer B executes the undo function. This operation corresponds to the cancellation of the operation of "creation of element 4" in the example according to FIG. 30. Once this operation is performed, the history DB manager 24 is notified of information on "designer B canceled the operation of 'creation of element 4'", and executes the following process.

First, the validity flag of the end operator reference history object 56, among the operator reference history object sequence that the operator reference history management object 50 for designer B manages and for which the validity flag is "valid", is changed to "invalid" (step 112). Since, in the present embodiment, the corresponding operator reference history object 54 is indicated by the arrow 76 of the validity history pointer, the corresponding operator reference history object 56 can be instantly retrieved. Next, the arrow 76 of the validity history pointer is moved to the operator reference history object 57, which is positioned immediately prior to the operator reference history object 56 for which the validity flag was set to "invalid" and is the end of the history information sequence for which the validity flag is "valid" (step 113).

Figure 18:
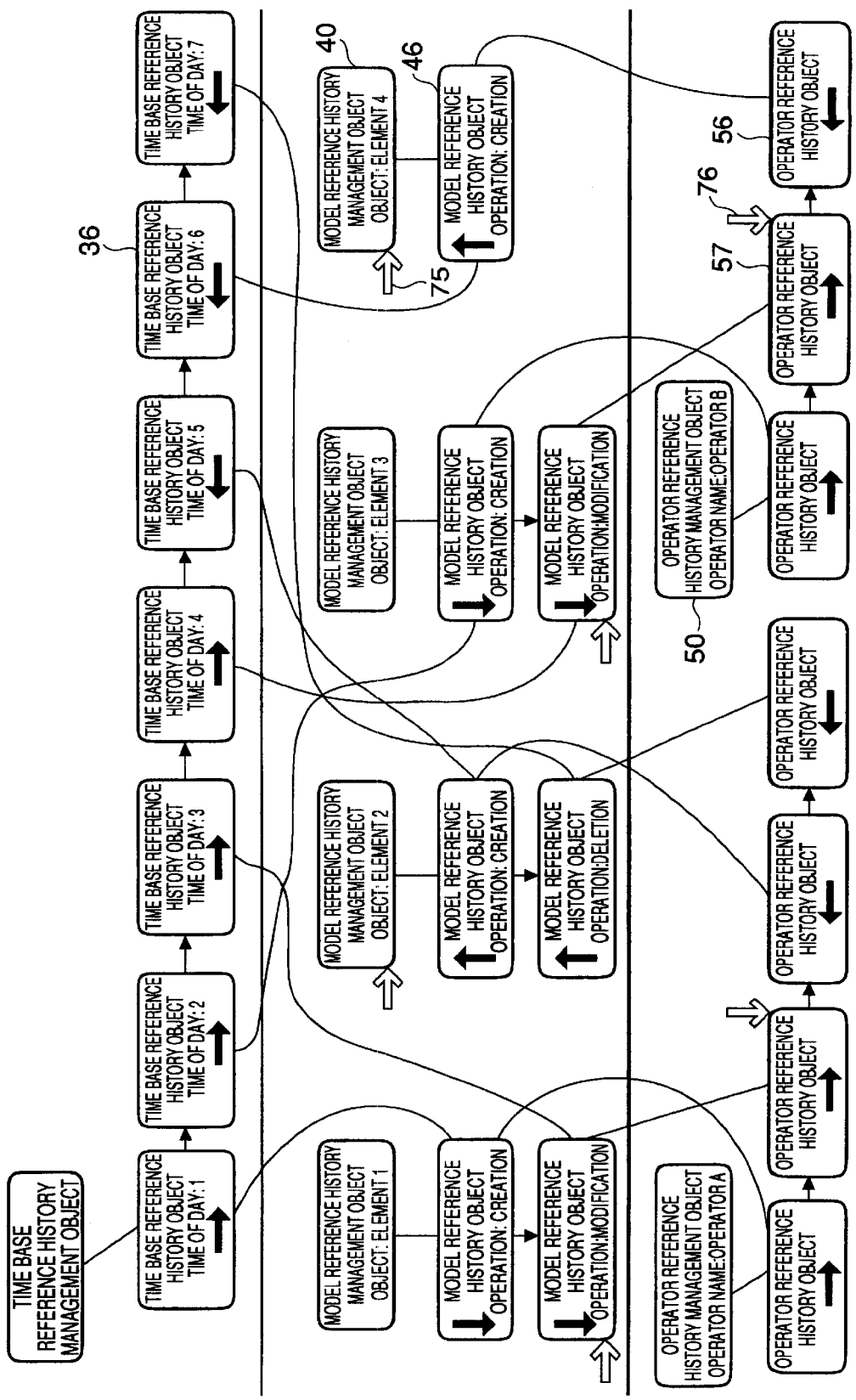
FIG. 18 conceptually shows the settings of the history information when the undo function was executed in the operator reference mode in the present embodiment.

Next, the history information of the model reference history management table that is linked by the model reference history pointer of the invalidated history information (operator reference history object 56) of the operator reference history management table, namely, the validity flag of the model reference history object 46 linked from the model reference history management object 40 for element 4 in FIG. 18 is changed to "invalid" (step 114). Next, an attempt is made to move the arrow 75 of the validity history pointer (step 116) to the end of the history information sequence for which the validity flag is "valid" (step 116). Although the corresponding model reference history object does not exist here, an attempt is made to point to the model reference history management object 40 for element 4 in preparation for execution of the redo function. Of course, each model reference history object is recorded and retained as history information and not deleted.

Next, the history information of the time base reference history management table that is linked by the time base reference history pointer in the model reference history management table, namely, the validity flag of the time base reference history object 36 in FIG. 18 is changed to "invalid" (step 117).

Figure 19:
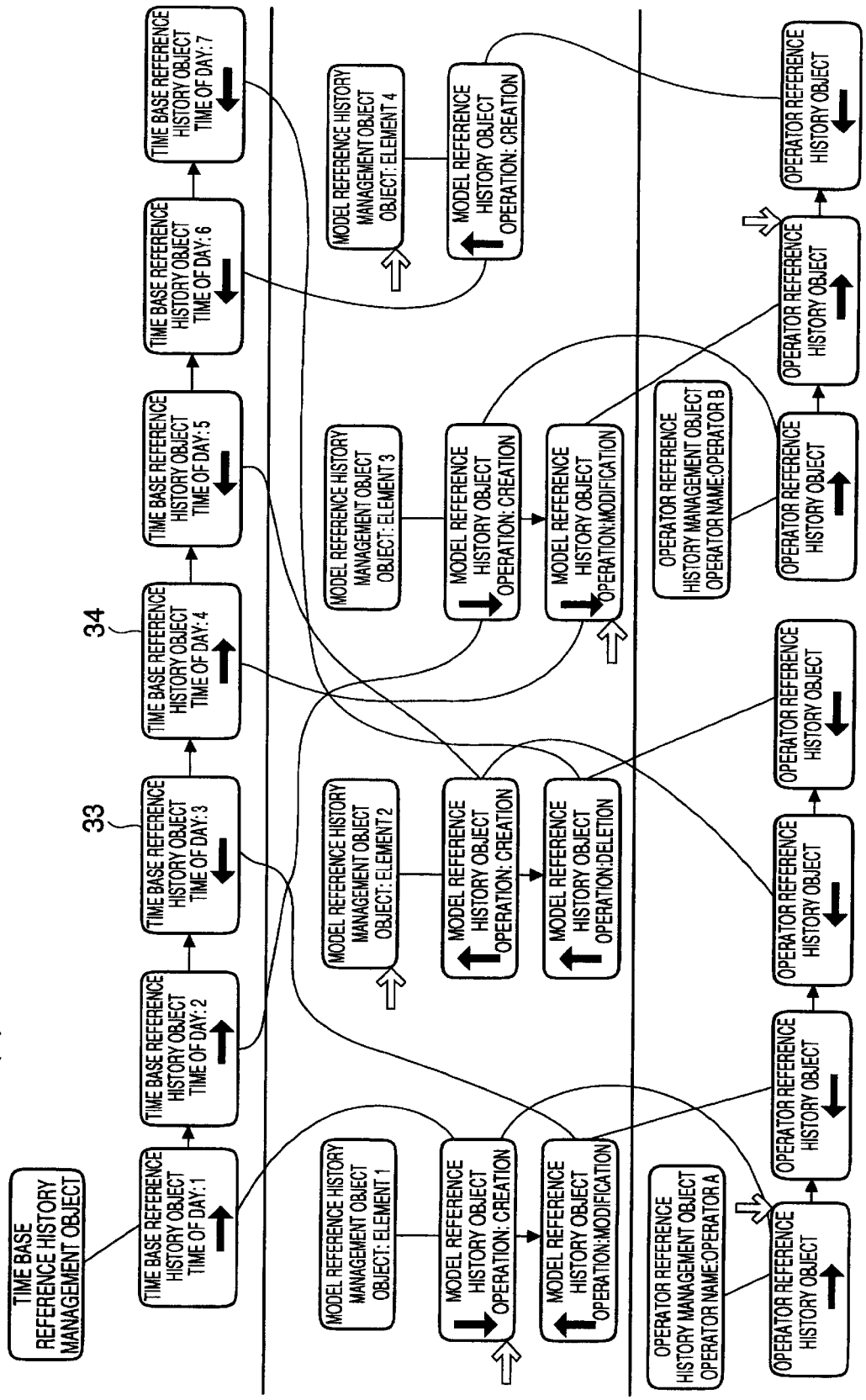
FIG. 19 conceptually shows the settings of the history information when the undo function was executed in the operator reference mode in the present embodiment.
Figure 20:
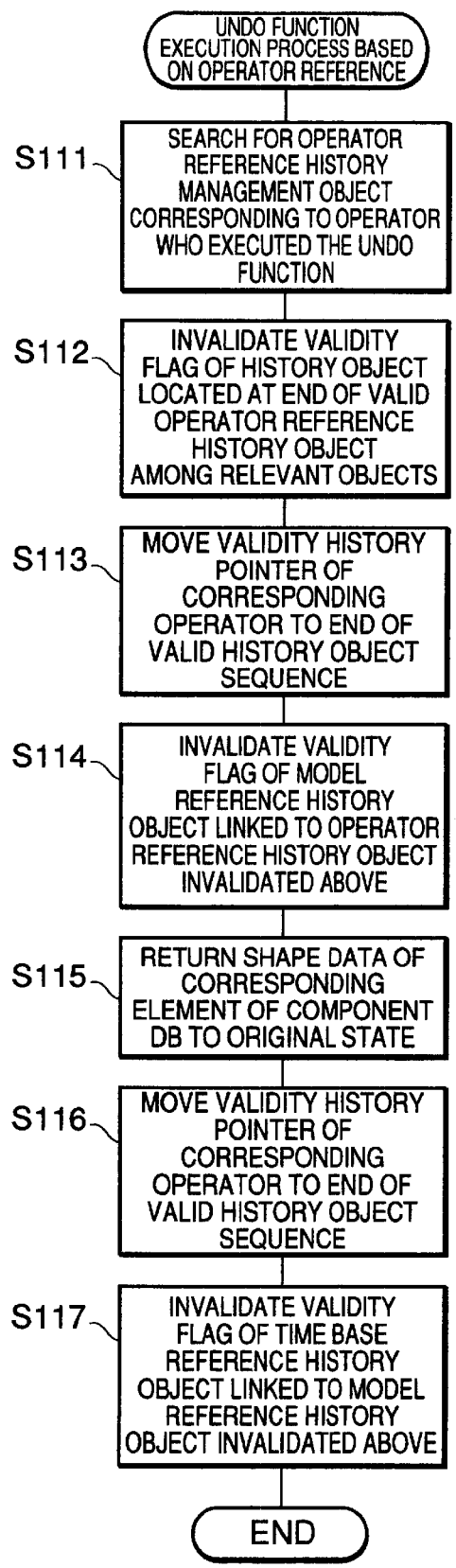
FIG. 20 is a flowchart showing the undo function execution process in the operator reference mode in the present embodiment.

In this manner, with respect to the execution of the undo function by designer B, only the last operation by designer B can be canceled without any affect on the history information based on the operation of designer A. Subsequent to this, even if designer A executes the undo function and cancels the operation of "modification of element 1", only the last operation of "modification of element 1" by designer A can be canceled without any affect on the history information based on the operation of designer B, provided the above-mentioned process is followed. The state of the history information at this time is shown in FIG. 19.

Execution of the Undo Function (time base reference mode)

Next, a process will be described for the case where the time base reference mode is selected.

As in the undo function in the time base reference mode of the prior art, the last operation performed within a team is canceled in sequence in accordance with the time of operation and regardless of the designer. In the above-mentioned operator reference mode, however, since cancellation of an operation is performed without restriction from the time base, valid time base reference history objects do not necessarily exist consecutively. More specifically, in FIG. 19, the valid time base reference history object 34 is likely to exist after the invalid time base reference history object 33. Since, in this sort of state, it is undesirable to execute the undo function in the time base reference mode in which the last operation is canceled in sequence, it is desirable to rectify this interrupted state if possible. Accordingly, the database server 20 executes a process, which complies with a predetermined condition when switching to the time base reference mode, to automatically invalidate a valid time base reference history object. This process is described with reference to the transition diagrams of the history information shown conceptually in FIGS. 19 and 21 and the flowchart shown in FIG. 22.

When selecting the time base reference mode with the assumption that the valid time base reference history objects are not consecutive, a specification is made as to whether to automatically invalidate until a certain time base reference history object. The control processor 12 of each terminal 10 has a list of history information sent from the history DB manager 24 and displayed on the display unit to allow specification by designers. For example, in FIG. 21, if it is desired to automatically invalidate the time base reference history objects after the time base reference history object 32 of "time of day: 2", the time base reference history object 32 is specified during selection of the time base reference mode. The validity history pointer that the time base reference history management object 30 manages is not moved during execution of the undo function in the operator reference mode because the time base reference history objects are not necessarily consecutive during execution of the undo function in the operator reference mode, and in the present embodiment it is pointless to execute this process after the position of the time base reference history to be invalidated has been specified during mode switching.

Figure 21:
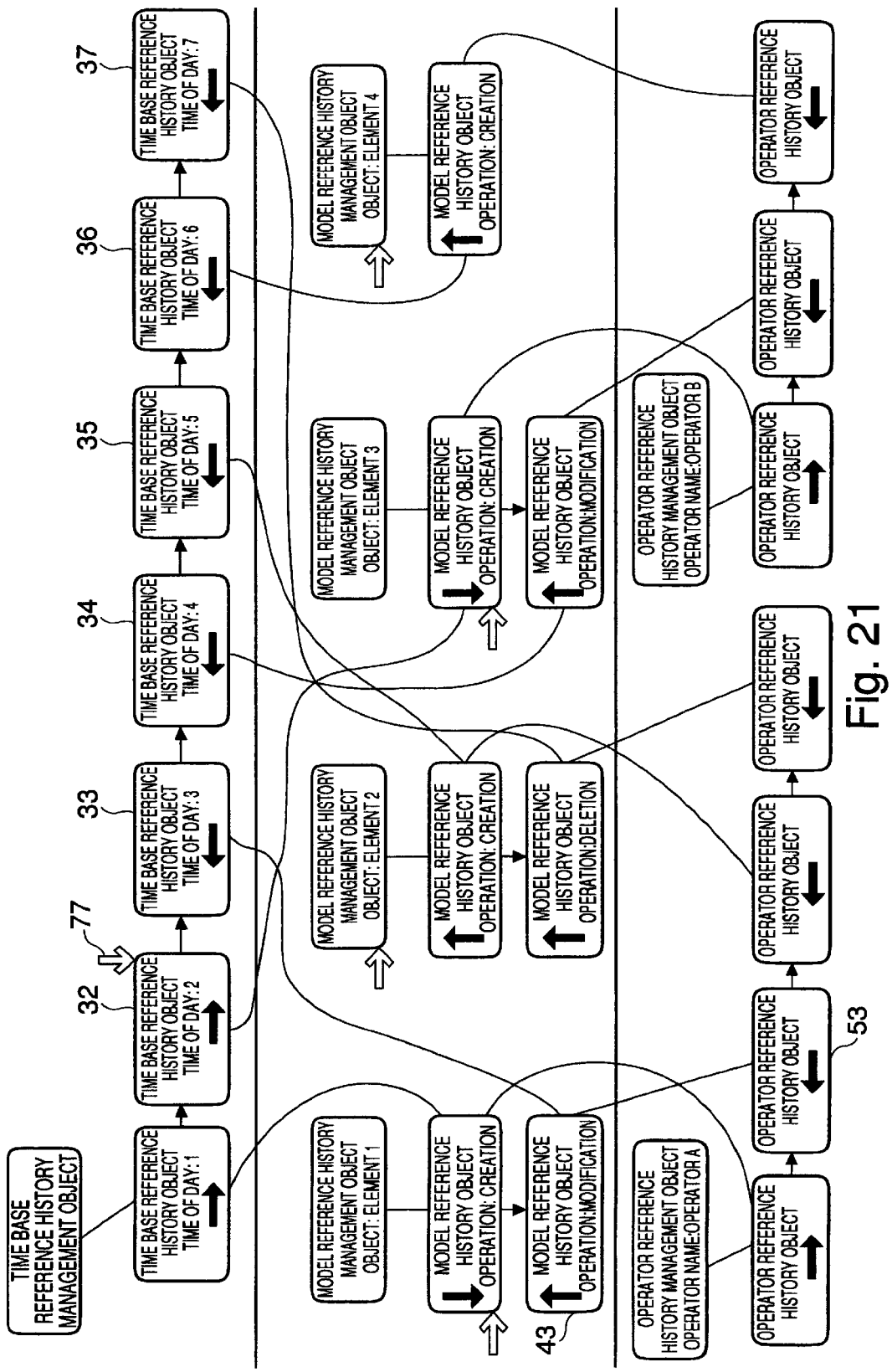
FIG. 21 conceptually shows the settings of the history information when switching was performed in the time base reference mode in the present embodiment.
Figure 22:
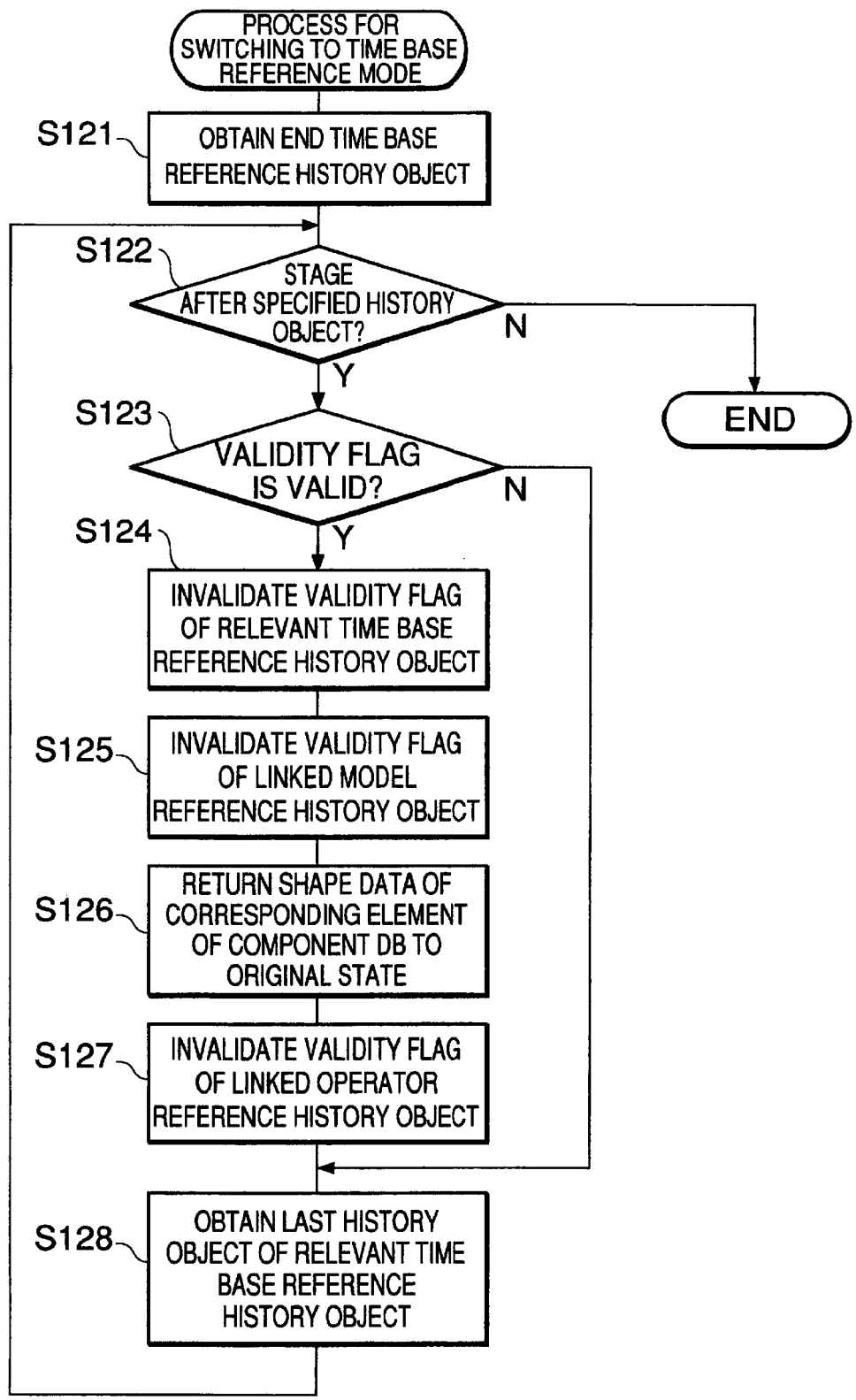
FIG. 22 is a flowchart showing the process of switching to the time base reference mode in the present embodiment.

First, the time base reference history object 37, which is at the end of the time base reference history object sequence starting from the time base reference history management object 30, is obtained (step 121). The relevant time base reference history object 37 is found after the specified time base reference history object 32 and is already invalidated so that nothing is processed. The time base reference history object 36, which is located immediately in front, is then obtained (step 122, 123, and 128). The time base reference history object 36, and the time base reference history objects 35 and 34 are further invalidated so that again nothing is processed. Next, the time base reference history object 33 is obtained (step 121). The relevant time base reference history object 33 is found after the specified time base reference history object 32 and the validity flag is "valid" so that the validity flag of this time base reference history object 33 is changed to "invalid" (step 124). The validity flag of the model reference history object 43 that is linked to the time base reference history object 33 is then changed to "invalid" (step 125). The component DB 21 is changed through the component DB manager 22 using the status information immediately prior to execution of operation on the element for the undo function linked to the model reference history object 43 and stored in the history DB 23 (step 126). This process is identical to step 115 in FIG. 20 so a detailed description will be omitted. Next, the history DB manager 24 changes the validity flag of the operator reference history object 53 to "invalid" (step 127). Next, since the time base reference history object 32, which is immediately in front of the time base reference history object 33, is the specified history object, the process terminates here (steps 128 and 122). This state is shown in FIG. 21.

According to the present embodiment, an automatic adjustment can be performed in the above-mentioned manner when switching to the time base reference mode so that the invalid time base reference history objects are consecutive. When the undo function is subsequently executed, it is a matter of canceling from the history object specified by a valid history pointer 77 that the time base reference history management object manages, and in this case, the process given in the above-mentioned steps 124 to 126 is executed. The validity history pointer that the model reference history management object 40 and the operator reference history management object 50 manage is not used during execution of the undo function in the time base reference mode so that it is not always necessary to move it in response to a change in the validity flag. When switching to the operator reference mode, automatic reset can be performed by referencing the validity flag of each history object.

In the present embodiment, when the process is performed to switch to the time base reference mode during design, there is a risk of forcibly canceling an operation by another designer or an operation that one does not wish to cancel. Thus, care is required in mode switching. However, this can be solved by providing an adjustment function during mode switching for performing various adjustments, such as outputting to each terminal 10 a confirmation message or an operation for automatic cancellation when one of the designers performs mode switching, or inhibiting mode switching if the operation for automatic cancellation is by another designer.

Execution of the Redo Function (Time Base Reference Mode)

Next, a process is described for the case where the redo function is executed in the time base reference mode.

As in the redo function in the time base reference mode of the prior art, the undo function that was last executed within a team is redone regardless of the designer. Namely, when the redo function is executed in the state of FIG. 21, the state shown in FIG. 23 results, This operation is described with reference to the flowchart shown in FIG. 24.

It in assumed that a designer has executed the redo function. According to FIG. 21, this corresponds to the redo command for the operation of "modification of element 1" by designer A. This operation is interpreted by the redo function execution unit 15 and transmitted to the database server 20 via the network 1. The transmitted operation contents include the designer name (=A) and operation name (=redo). Together with execution of the redo function, the history DB manager 24 first obtains the time base reference history object 33 (step 131) positioned at the beginning of invalidated time base reference history objects that are linked to the time base reference history management object 30. The time base reference history object 33 can be easily obtained also from the position of the validity history pointer indicated by the arrow 77. The validity flag of the time base reference history management object 30 is then changed to "valid" (step 132). Next, the validity history pointer is moved so as to indicate the validated time base reference history object 33 (step 133). The validity flag of the model reference history object 43 that is linked to the time base reference history object 33 is then changed to "valid" (step 134).

The component DB 21 is changed according to the case in the following manner through the component DB manager 22 using the status information linked to the model reference history object and stored in the history DB 23 (step 135).

In the case of redo for the operation of "creation", the saved shape data object is again registered in the set of existing and valid shape data objects. In the case of redo for the operation of "modification", the shape data object in the component DB 21 is changed using the backed up status information immediately after execution of the operation on the element for the redo. In the case of redo for the operation of "deletion", it is assumed the shape data object does not exist. The relevant shape data object is saved without change for another execution of the undo function. The example given corresponds to the case of redo for the operation of "modification". Thus, the shape data object will be changed using the status information that was backed up.

Figure 23:
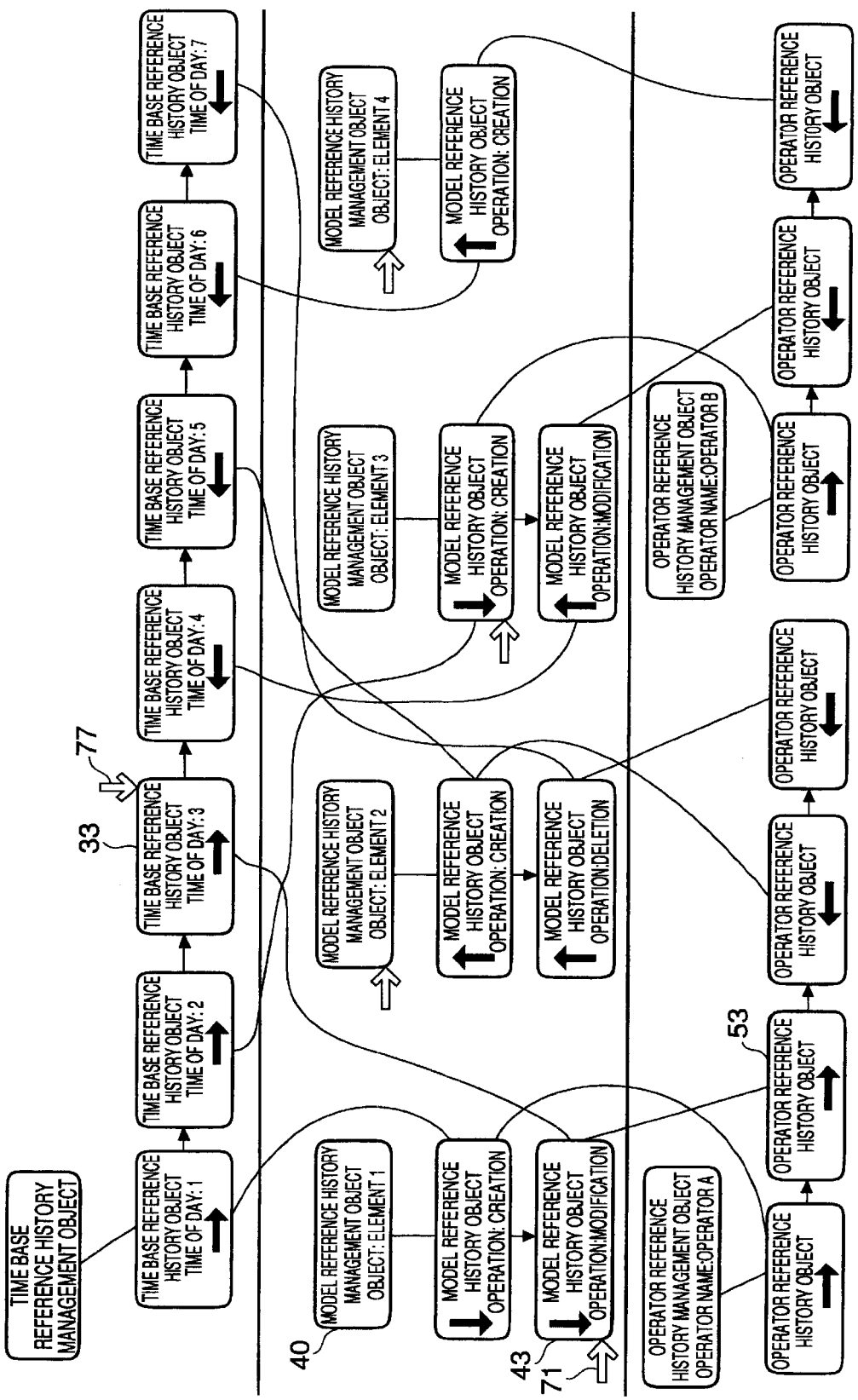
FIG. 23 conceptually shows the settings of the history information when the redo function was executed in the time base reference mode in the present embodiment.
Figure 24:
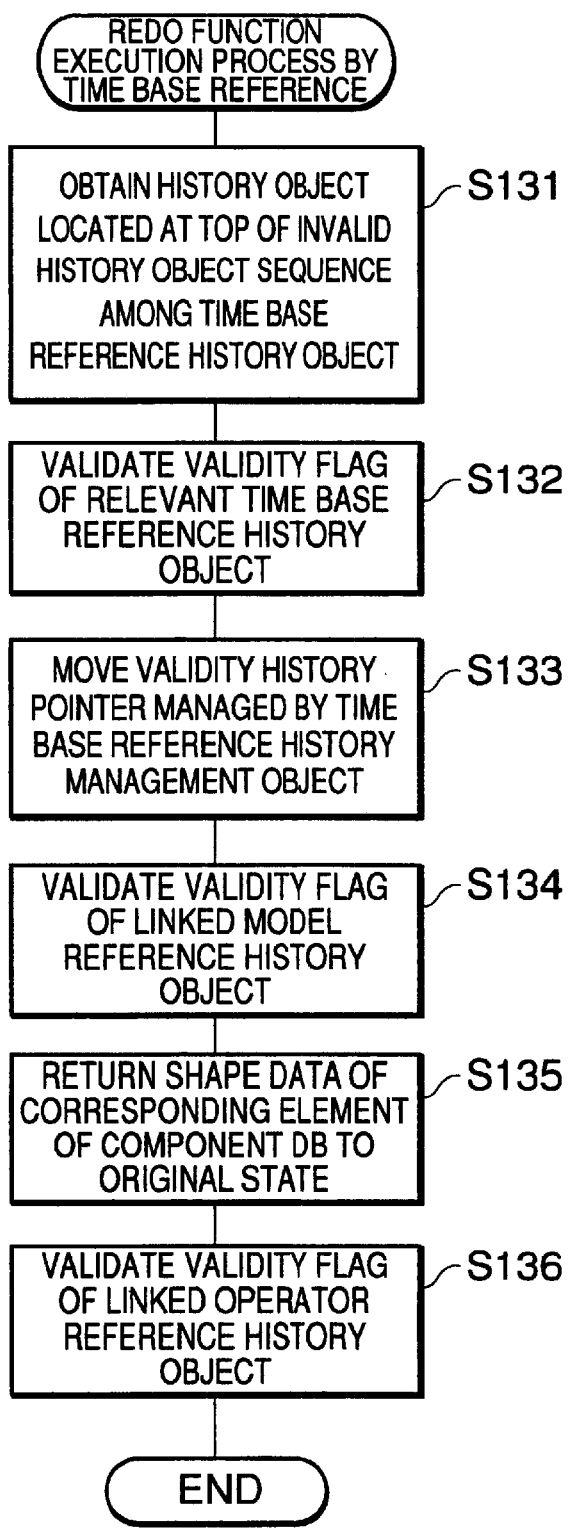
FIG. 24 is a flowchart showing the redo function execution process in the time base reference mode in the present embodiment.
Figure 25:
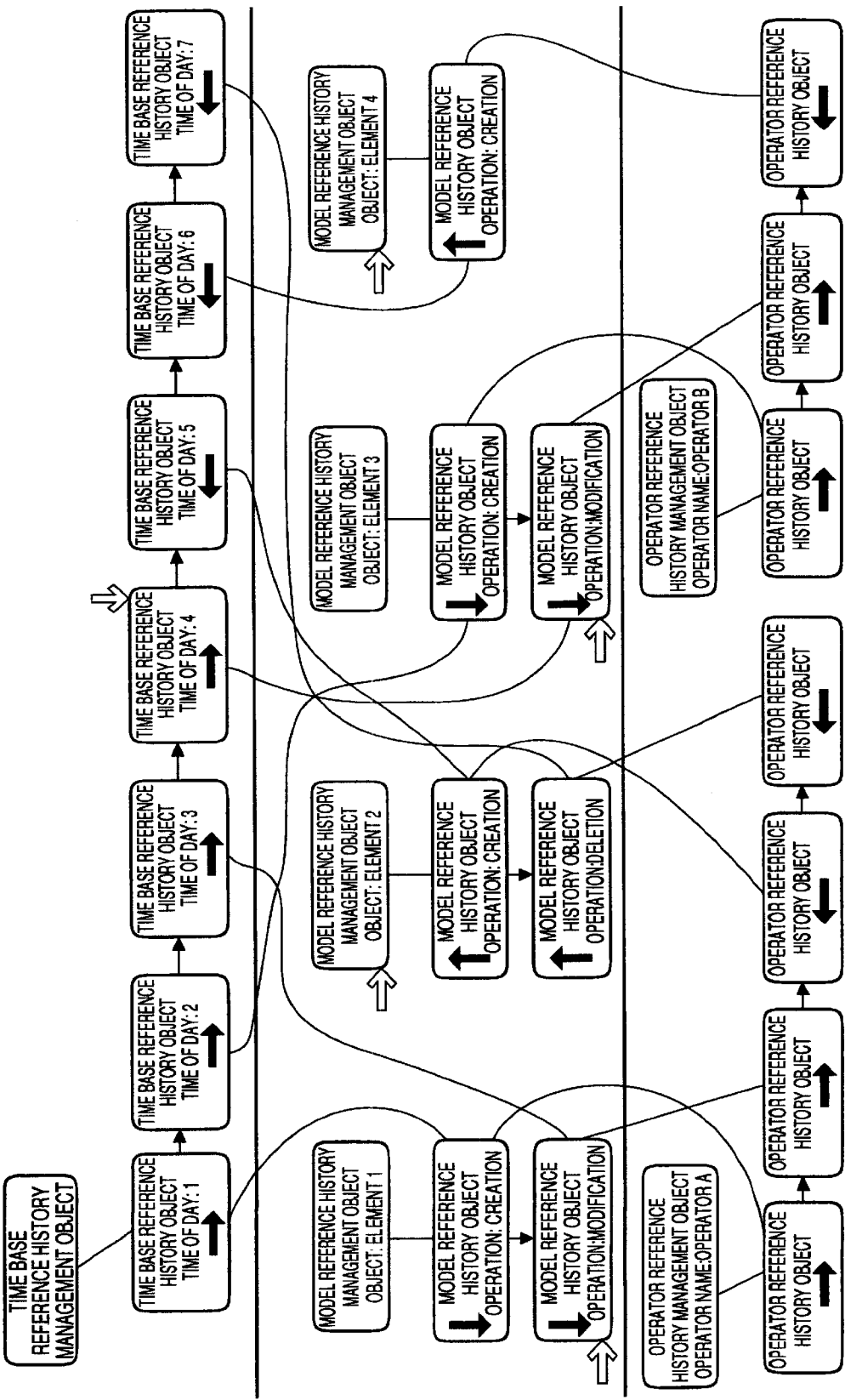
FIG. 25 conceptually shows the settings of the history information when the redo function was executed in the time base reference mode in the present embodiment.

Next, the history DB manager 24 changes to "valid" the validity flag of the operator reference history object 53 (step 136). In the present embodiment, as shown in FIG. 23, the arrow 71 of the validity history pointer that the model reference history management object 40 manages is moved to the model reference history object 43. Furthermore, the state when the redo function was executed is shown in FIG. 25.

According to the present embodiment, the redo function, which is identical to that in the prior art, can be implemented in this manner.

Execution of the Redo Function (Operator Reference Mode)

Figure 26:
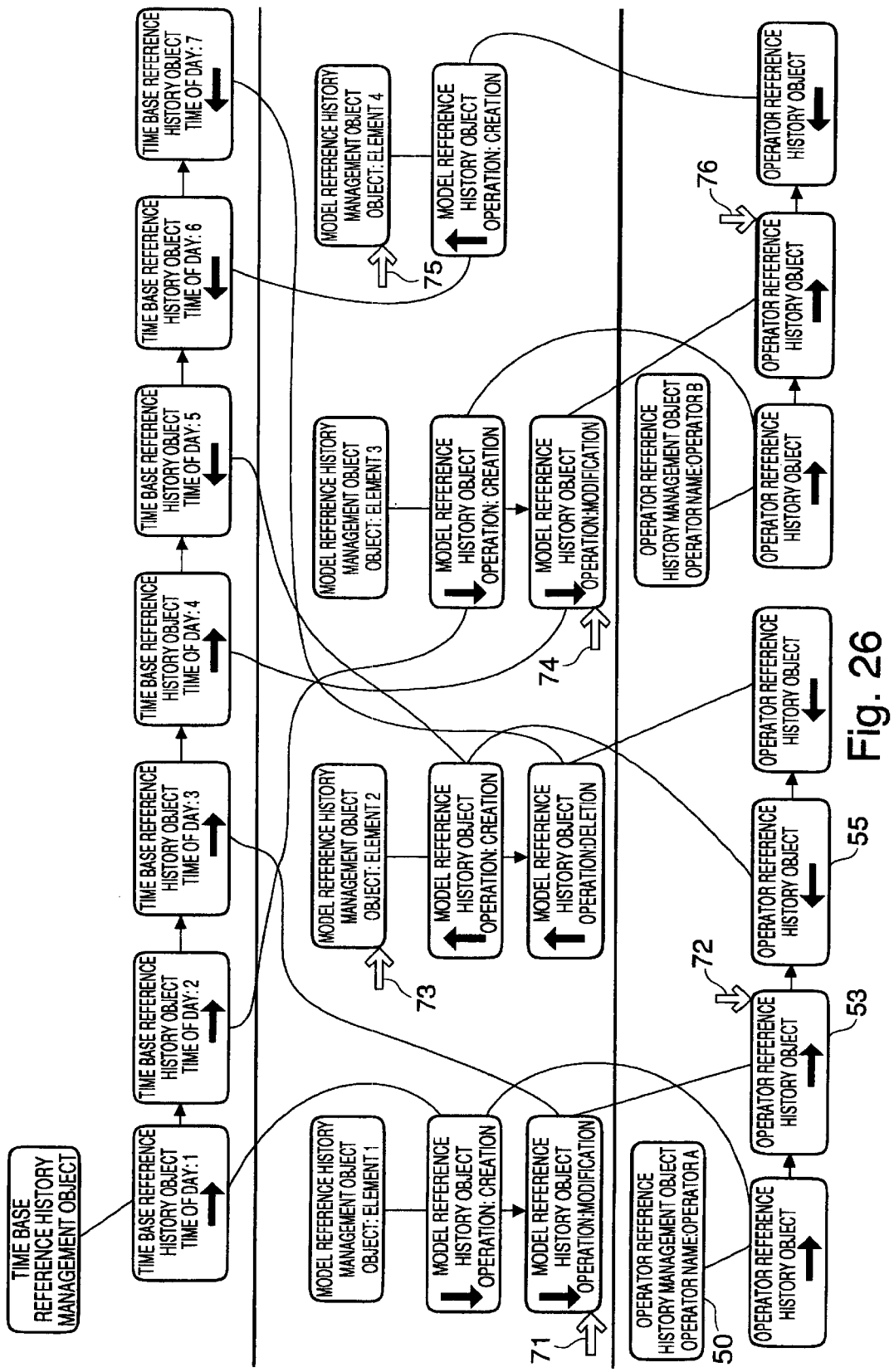
FIG. 26 conceptually shows the settings of the history information when switching was performed in the operator reference mode in the present embodiment.
Figure 27:
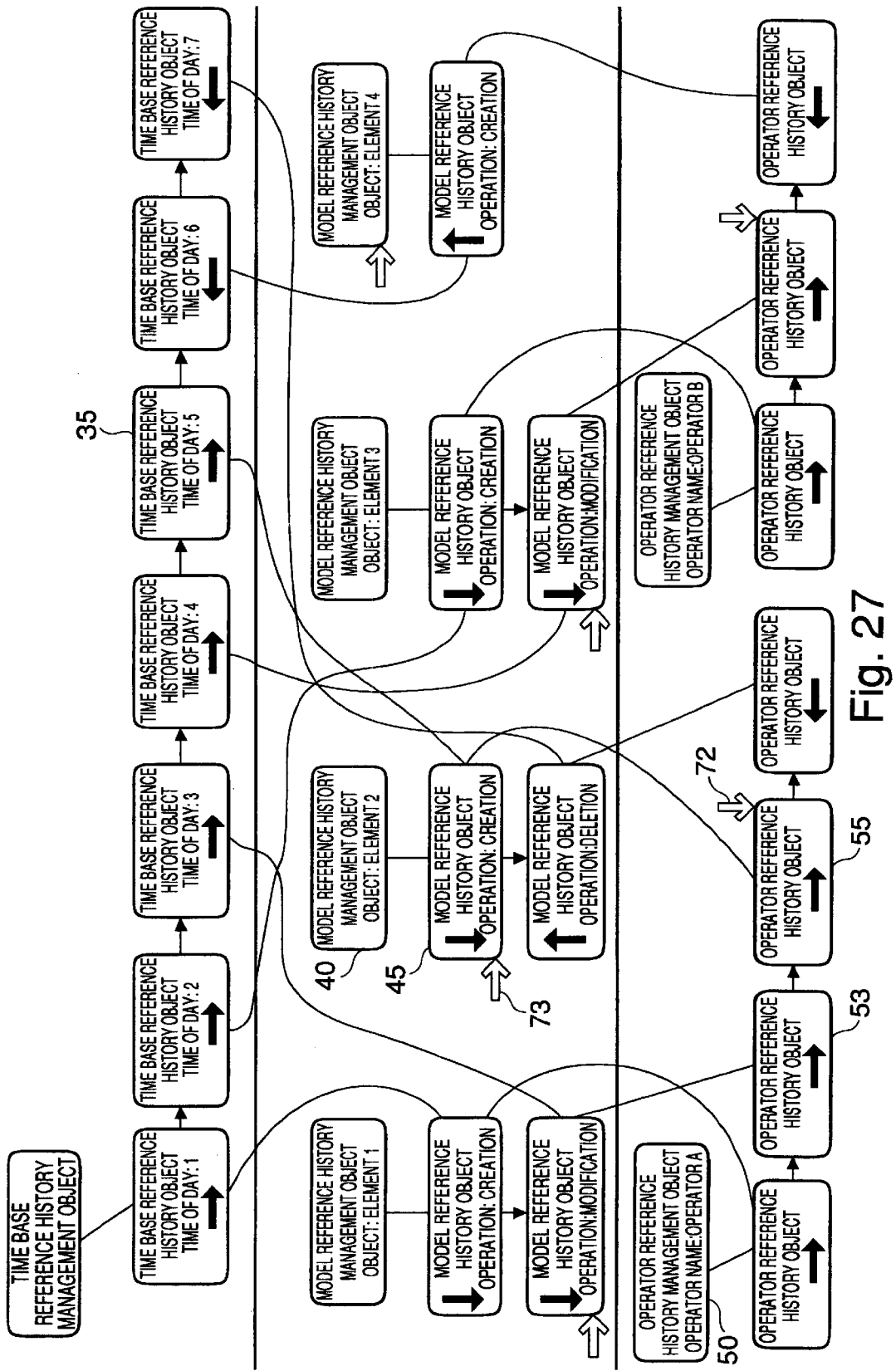
FIG. 27 conceptually shows the settings of the history information when the redo function was executed in the operator reference mode in the present embodiment.
Figure 28:
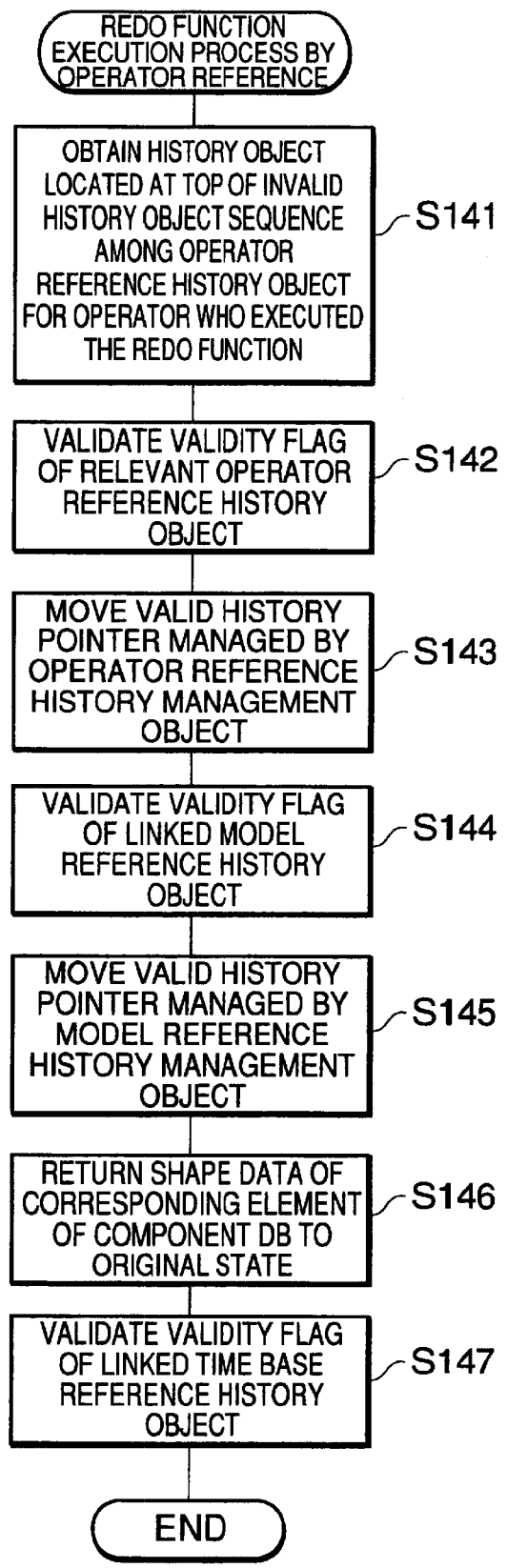
FIG. 28 is a flowchart showing the redo function execution process in the operator reference mode in the present embodiment.

Next, a process is described for the case where the redo function is executed in the operator reference mode. The validity history pointer that the model reference history management object 40 and the operator reference history management object 50 respectively manage is constantly moved so that a data conflict does not occur during the time base reference mode. FIG. 26 shows the state when the operator reference mode in FIG. 25 is selected and switched. When the redo function is executed by designer A in the state in FIG. 26, the state shown in FIG. 27 results. This operation is described with reference to the flowchart shown in FIG. 28.

The operation when designer A executes the redo function in the state shown in FIG. 26 corresponds to the redo command of the operation of "creation of element 2" in the example according to FIG. 30. This operation is interpreted by the redo function execution unit 15 and transmitted to the database server 20 via the network 1. The transmitted operation contents include the designer name (=A) and operation name (=redo). When executing the redo function, the history DB manager 24 first obtains the operator reference history object 55 positioned at the beginning of the invalidated object in the operator reference history object sequence that the operator reference history management object 50 for designer A manages (step 141). The operator reference history object 55 can also be easily obtained from the position of the validity history pointer indicated by the arrow 72. The validity flag of the operator reference history object 55 is then changed to "valid" (step 142). Next, the validity history pointer is moved so as to indicate the validated operator reference history object 55 (step 143). The validity flag of the model reference history object 45 that is linked to the operator reference history object 55 is then changed to "valid" and the validity history pointer of the model reference history management object 40 for element 2 is moved so as to indicate the model reference history object 45 (steps 144, 145). The shape data object regarding element 2 is redone so as to be put in a valid state (step 146). Since this process is identical to step 135 in FIG. 24, its description will be omitted. Furthermore, the history DB manager 24 changes to "valid" the validity flag of the time base reference history object 35 that is linked to the operator reference history object 55 via the model reference history object 45 (step 147).

According to the present embodiment, the redo function for each designer can be realized in this manner.

Other

Figure 29:
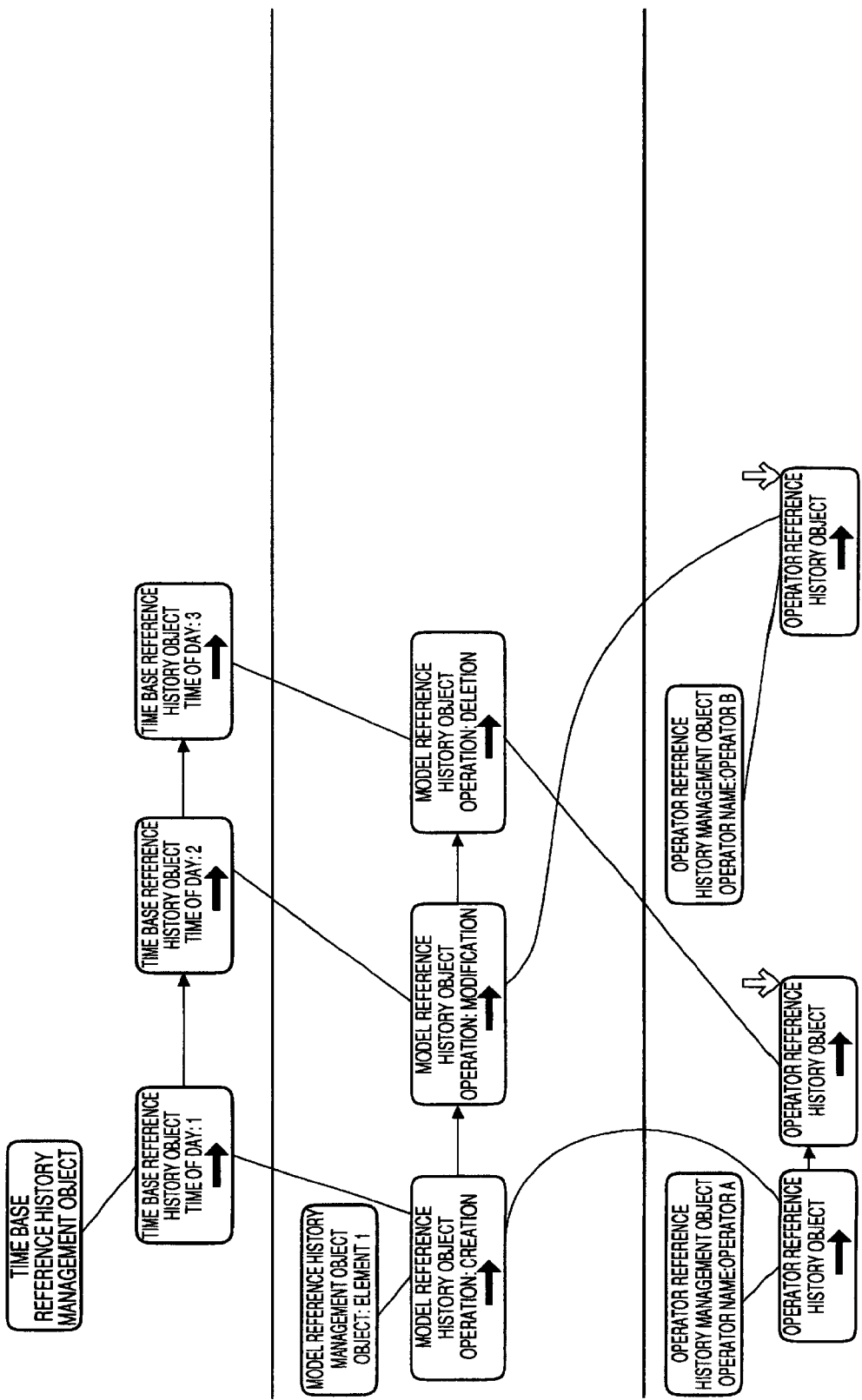
FIG. 29 conceptually shows the settings of the history information when an identical element is the object of operation by a plurality of operators in the present embodiment.

When designing with a team organization, a case where the same element is designed by a plurality of designers can be considered. For example, as shown in FIG. 29, the same element 1 is assumed to be the object of operations by both designers A and B. In the state shown in FIG. 29, when designer B executes the undo function to cancel the operation of "modification of element 1", the CAD system in the present embodiment discovers that the operation of "deletion of element 1" by designer A must also be canceled. Techniques to handle this sort of instance are given next.

First, a method can be considered for notifying designer B that execution is impossible due to the existence of the operation of designer A, thus resulting in an execution error. Second, a method can be considered for notifying designer A that the operation of "deletion of element 1" can be canceled since the undo function was executed by designer B thus permitting the selection of whether or not to cancel the operation. Third, a method can be considered for providing a mode in which an improper operation is unconditionally canceled so that the operation of "deletion of element 1" by designer A is forcibly canceled. The state shown in FIG. 29 can be handled by an arbitrary method that includes the methods illustrated or other methods.

Constructing the history DB 23 shown in the present embodiment easily allows application to various types of operations. For example, in the above-mentioned description, while one operation at a time is canceled by the manual execution of the undo function, the operations until a specified time can also be automatically canceled.

A common shape database (component DB 21) and history DB 23 were provided in the present embodiment since the example for the case where a single design was divided into a plurality of components, and each component formed from a plurality of elements is further designed in teams. However, the present embodiment is also applicable to the high level overall design, or to a further subdivided low level, team-based design. Alternatively, if component information indicating to which component the data belongs is added to the history information and shape data object without dividing a single design into a plurality of components, a shared database in the overall design can be provided even in the case where a team is formed per component.

Although the description for the case of two designers, A and B, was given in the present embodiment, it goes without saying that this invention can be embodied for a case of three or more designers.

Furthermore, although objects were formed in the present embodiment, it is also possible to construct a CAD system concerning the present invention with techniques besides object-oriented technology.

While there has been described what are at present considered to be the preferred embodiments of the invention, it will be understood that various modifications may be made thereto, and it is intended that the appended claims cover all such modifications as fall within the true spirit and scope of the invention.

What is claimed is:

1. A CAD system for team-based design comprising:
   means for sequentially recording contents of operations performed by the designers as history information into common history information storing means in design tasks performed by a plurality of designers in teams, and providing an undo function to cancel the last operation according to the order recorded in said history information storing means in the history information;
   history information collecting means for recording to said history information storing means, each time the designer performs an operation, history information, which includes information on the time the operation was performed, elements included in the design for which the operation was performed, the type of the operation, and information of the designer who performed the operation, with information representing validity or invalidity of the operation that was set to valid; and
   undo function control processing means for canceling the operation that is the object when the undo function is executed and for changing to invalid the information representing validity or invalidity of the operation corresponding to history information of the operation that has been recorded in said history information storing means;
   said undo function control processing means cancels the last operation that the operator performed when the operator executes the undo function.

2. The CAD system for team-based design according to claim 1 wherein.
   said undo function control processing means cancels, in accordance with mode selection by the designer when the designer executes the undo function, either the last operation performed by the designer or the last operation according to the time of operation.

3. The CAD system for team-based design according to claim 2 wherein:
   said undo function control processing means provides, as the undo function, a selection between a designer reference mode for execution of the undo function by designer and a time base reference mode for execution of the undo function according to the time of operation.

4. The CAD system for team-based design according to claim 3 wherein:
   said undo function control processing means performs, when switching from the designer reference mode to the time base reference mode, automatic adjustment so that the history information recorded in said history information storing means as invalid operation is consecutive.

5. The CAD system for team-based design according to claim 1 comprising;
   redo function control processing means for redoing an operation that was canceled by execution of the last undo function when a redo function is executed and for changing to valid the information representing validity or invalidity of the operation corresponding to history information of the operation that has been recorded into said history information storing means; wherein
   the operation that was canceled by a designer executing the last undo function is redone by searching said history information storing means when the designer executes the undo function.

6. The CAD system for team-based design according to claim 5 wherein:
   said redo function control processing means restores, according to the mode selection by a designer when the designer executes the redo function, either the operation that was canceled by execution of the undo function by the designer or the operation that was canceled by execution of the last undo function according to the time the undo function was executed.

7. The CAD system for team-based design according to claim 6 wherein:
   said redo function control processing means provides, as the redo function, a selection between a designer reference mode for execution of the redo function by designer and a time base reference mode for execution of the redo function according to time of operation.

8. The CAD system for team-based design according to claim 1 wherein:
   said history information collecting means manages the history information regarding a single operation by grouping according to time base reference, element, and designer.

* * * * *